United States Patent
Ogasawara et al.

(10) Patent No.: US 7,305,670 B2
(45) Date of Patent: *Dec. 4, 2007

(54) METHOD OF INSTALLING SOFTWARE ON STORAGE DEVICE CONTROLLING APPARATUS, METHOD OF CONTROLLING STORAGE DEVICE CONTROLLING APPARATUS, AND STORAGE DEVICE CONTROLLING APPARATUS

(75) Inventors: Hiroshi Ogasawara, Kanagawa (JP); Yutaka Takata, Kanagawa (JP); Naotaka Kobayashi, Kanagawa (JP); Jinichi Shikawa, Chiba (JP); Nobuyuki Saika, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 500 days.

This patent is subject to a terminal disclaimer.

(21) Appl. No.: 10/757,958

(22) Filed: Jan. 13, 2004

(65) Prior Publication Data

US 2004/0249920 A1 Dec. 9, 2004

(30) Foreign Application Priority Data

Jan. 20, 2003 (JP) .............................. 2003-011595

(51) Int. Cl.
*G06F 9/45* (2006.01)
*G06F 16/17* (2006.01)
(52) U.S. Cl. ...................... 717/171; 709/213; 709/217; 709/218
(58) Field of Classification Search ................ 717/171, 717/174, 176, 177
See application file for complete search history.

(56) References Cited

U.S. PATENT DOCUMENTS 4,476,526 A  10/1984  Dodd
5,367,686 A * 11/1994  Fisher et al. ................. 717/174

(Continued)

FOREIGN PATENT DOCUMENTS

EP  1791755 A2  3/2003

(Continued)

OTHER PUBLICATIONS

Katz, Randy H.; "Network-Attached Storage Systems"; Apr. 1992; IEEE; pp. 68-75.*

(Continued)

*Primary Examiner*—Mary Steelman
(74) *Attorney, Agent, or Firm*—Townsend and Townsend and Crew LLP

(57) ABSTRACT

A method of installing software on a storage device controlling apparatus which includes at least one channel controller having a circuit board on which are formed a file access processing section receiving requests to input and output data in files as units from an information processing apparatus via a first network and an I/O processor outputting I/O requests corresponding to the requests to input and output data to a storage device; at least one disk controller executing input and output of data into and from the storage device in response to the I/O requests sent from the I/O processor; and a second network connecting the channel controller and the disk controller so as to be able to communicate with each other, the method comprises the step of writing software for enabling the file access processing section to function, into the storage device by communicating with the channel controller via the second network.

20 Claims, 15 Drawing Sheets

U.S. PATENT DOCUMENTS

| | | |
|---|---|---|
| 5,640,596 A | 6/1997 | Takamoto et al. |
| 5,864,712 A | 1/1999 | Carmichael et al. |
| 5,894,560 A | 4/1999 | Carmichael et al. |
| 5,991,797 A | 11/1999 | Futral et al. |
| 6,438,586 B1 | 8/2002 | Hass et al. |
| 6,549,988 B1 | 4/2003 | Gertner |
| 6,606,690 B2 * | 8/2003 | Padovano ................ 711/148 |
| 6,665,703 B1 * | 12/2003 | Shatil et al. ............. 709/200 |
| 6,782,389 B1 * | 8/2004 | Chrin et al. ................ 707/10 |
| 6,785,742 B1 * | 8/2004 | Teow et al. ................. 710/1 |
| 6,795,965 B1 * | 9/2004 | Yadav .................... 717/168 |
| 6,918,112 B2 | 7/2005 | Bourke-Dunphy et al. . 717/177 |
| 7,107,385 B2 * | 9/2006 | Rajan et al. ................ 711/4 |
| 7,111,055 B2 * | 9/2006 | Falkner ................... 709/221 |
| 7,171,452 B1 * | 1/2007 | Gole ...................... 709/212 |
| 7,188,166 B2 * | 3/2007 | Minematsu .............. 709/223 |
| 2002/0103969 A1 * | 8/2002 | Koizumi et al. ........... 711/114 |
| 2002/0133814 A1 * | 9/2002 | Bourke-Dunphy et al. . 717/174 |
| 2002/0152339 A1 | 10/2002 | Yamamoto |
| 2002/0178143 A1 | 11/2002 | Fujimoto |
| 2002/0188733 A1 * | 12/2002 | Collins et al. ............. 709/229 |
| 2003/0009619 A1 | 1/2003 | Kano et al. |
| 2003/0023665 A1 * | 1/2003 | Matsunami et al. ........ 709/201 |
| 2003/0088683 A1 * | 5/2003 | Kitamura et al. ........... 709/230 |
| 2003/0105767 A1 | 6/2003 | Sonoda et al. |
| 2003/0120674 A1 | 6/2003 | Morita et al. |
| 2003/0191909 A1 | 10/2003 | Asano et al. |
| 2003/0200487 A1 | 10/2003 | Taninaka et al. |
| 2003/0233502 A1 * | 12/2003 | Murotani et al. ............ 710/74 |
| 2004/0054849 A1 | 3/2004 | Deenadhayalan et al. |
| 2004/0088697 A1 * | 5/2004 | Schwartz et al. ........... 717/174 |
| 2004/0133718 A1 | 7/2004 | Kodama et al. |

FOREIGN PATENT DOCUMENTS

| | | |
|---|---|---|
| JP | 2002-351703 | 12/2002 |

OTHER PUBLICATIONS

Gibson, Garth A. and Rodney Van Meter; "Network Attached Storage Architecture"; Nov. 2000; Communications of the ACM; vol. 43 Issue 11; pp. 37-45.*

No non-patent literature cited.

* cited by examiner

162a  PHYSICAL DISK MANAGING TABLE

| DISK NUMBER | CAPACITY | RAID | USAGE STATE |
|---|---|---|---|
| #001 | 100GB | 5 | USED |
| #002 | 100GB | 5 | USED |
| #003 | 100GB | 5 | USED |
| #004 | 100GB | 5 | USED |
| #005 | 100GB | 5 | USED |
| #006 | 50GB | — | UNUSED |
| ⋮ | ⋮ | ⋮ | ⋮ |

162b  LU MANAGING TABLE

| LU NUMBER | PHYSICAL DISK | CAPACITY | RAID |
|---|---|---|---|
| #1 | #001, #002, #003, #004, #005 | 100GB | 5 |
| #2 | #001, #002, #003, #004, #005 | 300GB | 5 |
| #3 | #006, #007, | 200GB | 1 |
| ⋮ | ⋮ | ⋮ | ⋮ |

METADATA

| FILE NAME | TOP ADDRESS | CAPACITY | OWNER | UPDATE TIME |
|---|---|---|---|---|
| A | 7BSA | 200MB | X | 0 : 00 |
| B | 05BF | 50MB | X | 7 : 57 |
| C | 1F30 | 100MB | Y | 9 : 15 |
| D | 470B | 100MB | Z | 15 : 20 |
| ⋮ | ⋮ | ⋮ | ⋮ | ⋮ |

FILE LOCK TABLE

| FILE NAME | LOCK/UNLOCK |
|---|---|
| A | LOCKED |
| B | — |
| C | — |
| D | LOCKED |
| ⋮ | ⋮ |

722

LU LOCK TABLE

| LU | LOCK/UNLOCK |
|---|---|
| SHARED | — |
| 1 | LOCKED |
| 2 | — |
| ⋮ | ⋮ |

FIG. 16

INITIAL INSTALLATION

| SLOT NO. | CHANNEL ADAPTOR SELECTION | SYSTEM LU NO. | BOOT DESIGNATION |
|---|---|---|---|
| 1 | CHN ▷ | 112 | NETWORK BOOT ▷ |
| 2 | CHN ▷ | 21 | NETWORK BOOT ▷ |
| 3 | CHN ▷ | 158 | NETWORK BOOT ▷ |
| 4 | CHN ▷ | 72 | NETWORK BOOT ▷ |
| 5 | CHF ▷ | 5 | DISK BOOT ▷ |
| 6 | CHF ▷ | 24 | DISK BOOT ▷ |
| 7 | CHA ▷ | 60 | DISK BOOT ▷ |
| 8 | CHA ▷ | 125 | DISK BOOT ▷ |

OK  CANCEL

FIG. 17

| CLUSTER SETUP | | | | | | |
|---|---|---|---|---|---|---|
| POWER SUPPLY SYSTEM | SLOT NO. | BOARD ID | BOARD TYPE | TO-FAIL-OVER 1 | TO-FAIL-OVER 2 | SHARED LU |
| A | 1 | a | CHN | 2 ▷ | 3 ▷ | 58 |
| B | 2 | b | CHN | 3 ▷ | 4 ▷ | 58 |
| A | 3 | c | CHN | 4 ▷ | 1 ▷ | 58 |
| B | 4 | d | CHN | 6 ▷ | 2 ▷ | 58 |
| A | 5 | e | CHF | 5 ▷ | — ▷ | 132 |
| B | 6 | f | CHF | 8 ▷ | — ▷ | 132 |
| A | 7 | g | CHA | 7 ▷ | — ▷ | 47 |
| B | 8 | h | CHA | | | 47 |

SET  CANCEL

METHOD OF INSTALLING SOFTWARE ON STORAGE DEVICE CONTROLLING APPARATUS, METHOD OF CONTROLLING STORAGE DEVICE CONTROLLING APPARATUS, AND STORAGE DEVICE CONTROLLING APPARATUS

CROSS-REFERENCE TO RELATED APPLICATIONS

The present application claims priority upon Japanese Patent Application No. 2003-011595 filed on Jan. 20, 2003, which is herein incorporated by reference.

BACKGROUND OF THE INVENTION

1. Field of the Invention

The present invention relates to a method of installing software on a storage device controlling apparatus, a method of controlling a storage device controlling apparatus, and a storage device controlling apparatus.

2. Description of the Related Art

In recent years, the amount of data handled by computer systems has been greatly increased. As storage systems for managing these data, large-scale storage systems called a mid-range class or enterprise class, managed according to a RAID (Redundant Arrays of Inexpensive Disks) method which provides an enormous storage source, are drawing attention these days. Moreover, to efficiently manage the enormous amount of data, a technology has been developed, in which an exclusive network (Storage Area Network; hereinafter referred to as SAN) connects information processing apparatuses and a storage system such as a disk array apparatus to implement high-speed and massive access to the storage system.

Meanwhile, a storage system called a NAS (Network Attached Storage) has been developed, in which a network using TCP/IP (Transmission Control Protocol/Internet Protocol) protocols, etc., connects a storage system and information processing apparatuses to implement access in file level from the information processing apparatuses (e.g., Japanese Patent Application Laid-Open Publication No. 2002-351703).

However, a conventional NAS has been achieved by connecting information processing apparatuses having TCP/IP communication and file system functions to a storage system without TCP/IP communication and file system functions. Therefore, installation spaces have been required for the abovementioned information processing apparatuses to be connected. Moreover, the information processing apparatuses and storage system are usually connected by a SAN in order to perform high-speed communication. Thus, the information processing apparatus has been required to be provided with a communication controlling apparatus or a communication controlling function. Furthermore, in order to make the storage system work as a NAS, it has been required to install a piece of software on each of the storage system without the TCP/IP communication and file system functions, and the information processing apparatuses having the TCP/IP communication and file system functions, and further to perform various settings to link those pieces of software.

SUMMARY OF THE INVENTION

The present invention has been made in view of the abovementioned problems, and the main object of the present invention is to provide a method of installing software on a storage device controlling apparatus, a method of controlling a storage device controlling apparatus, and a storage device controlling apparatus.

In order to solve the abovementioned problems, the method according to the present invention of installing software on a storage device controlling apparatus is a method of installing software on a storage device controlling apparatus which includes at least one channel controller having a circuit board on which are formed a file access processing section receiving requests to input and output data in files as units from an information processing apparatus via a first network and an I/O processor outputting I/O requests corresponding to the requests to input and output data to a storage device; at least one disk controller executing input and output of data into and from the storage device in response to the I/O requests sent from the I/O processor; and a second network connecting the channel controller and the disk controller so as to be able to communicate with each other, the method comprising the step of: writing software for making the file access processing section function, into the storage device by communicating with the channel controller via the second network.

Note that the information processing apparatus is, for example, a personal computer or a mainframe computer which accesses a storage system comprising the storage device controlling apparatus having the abovementioned structure via LAN or SAN. The function of the file access processing section is provided by an operating system executed on CPU and software such as NFS (Network File System) which runs on this operating system. The storage device is a disk drive such as a hard disk unit. The I/O processor comprises, for example, an IC (Integrated Circuit) separate from the CPU as a hardware element, which is the hardware element of the file access processing section, and controls the communication between the file access processing section and the disk controller. The disk controller writes and reads data into and from the storage device.

Further, by installing firmware or software to make the file access processing section work in the storage device, the storage system can provide the information processing apparatus with a function to work as a NAS.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 13 is a view showing metadata according to the present embodiment;

FIG. 14 is a view showing lock tables according to the present embodiment;

FIG. 16 shows an example of the screen displayed on the output unit of the managing terminal to install the software according to the present embodiment;

FIG. 17 shows an example of the screen displayed in an information processing apparatus to set a cluster according to the present embodiment;

DETAILED DESCRIPTION OF THE INVENTION

At least the following matters will be made clear by the explanation in the present specification and the description of the accompanying drawings.

An embodiment of the present invention will be described in detail below with reference to the drawings.

Figure 1:
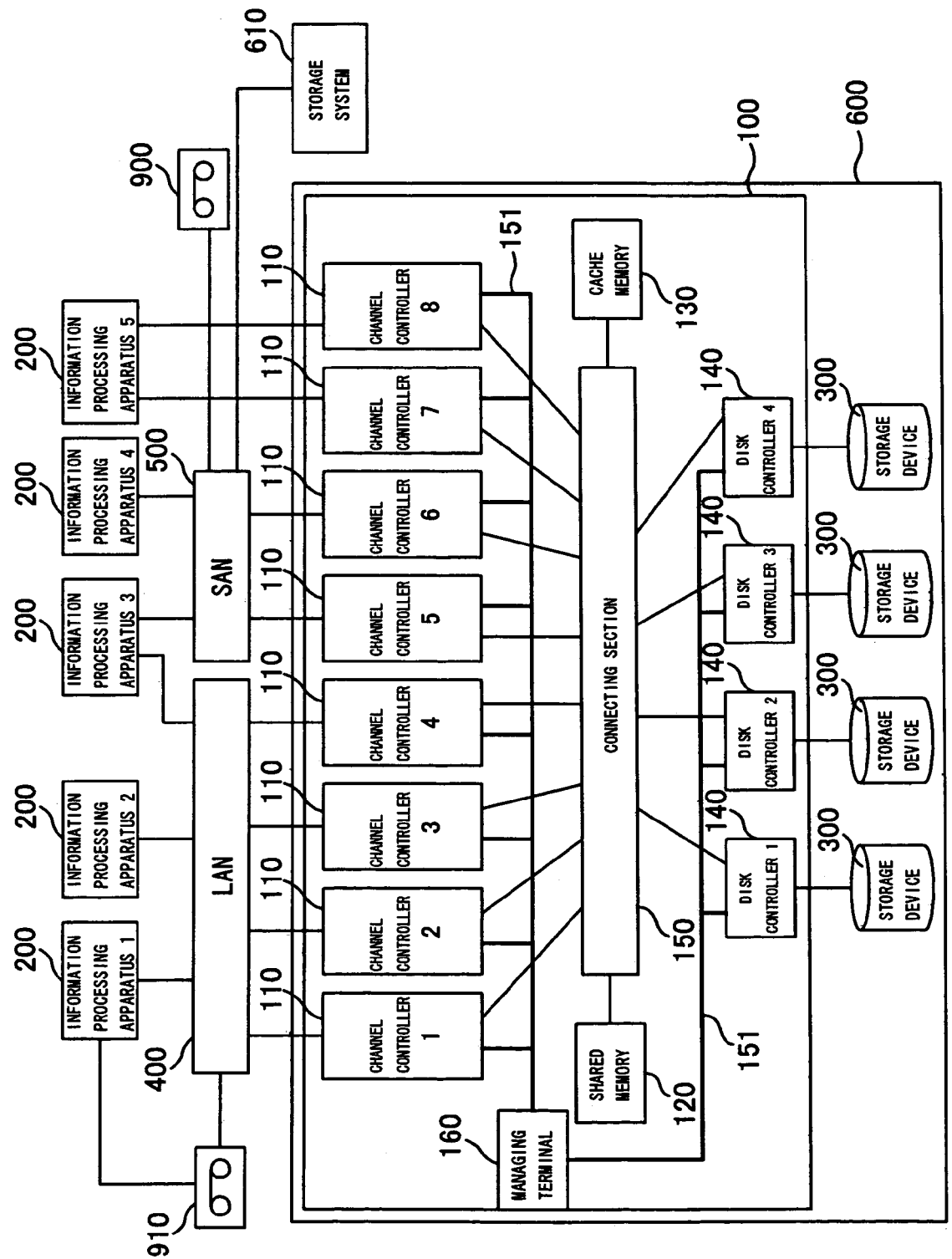
FIG. 1 is a block diagram showing the entire construction of a storage system according to the present embodiment.

FIG. 1 is a block diagram showing the entire construction of a storage system 600 according to the present embodiment.

===Example of the Entire Construction===

The storage system 600 comprises a storage device controlling apparatus 100 and storage devices 300. The storage device controlling apparatus 100 controls the storage devices 300 according to commands received from information processing apparatuses 200. For example, when requests to input and output data are received from an information processing apparatus 200, the storage device controlling apparatus 100 performs processing for the input and output of data stored in a storage device 300. Data is stored in a memory area, a logical unit (hereinafter, referred to as LU) logically set in a physical memory area provided by the disk drive of the storage device 300. The storage device controlling apparatus 100 also receives various commands from the information processing apparatuses 200 to manage the storage system 600.

The information processing apparatus 200 is a computer having a CPU (Central Processing Unit) and a memory. Execution of various programs by the CPU provided in the information processing apparatus 200 implements various functions. The information processing apparatus 200 is, for example, a personal computer, a workstation or a mainframe computer.

In FIG. 1, the information processing apparatuses 1 to 3 (200) are connected to the storage device controlling apparatus 100 via a LAN (Local Area Network) 400. The LAN 400 may be the Internet or an exclusive network. Communication between the information processing apparatuses 1 to 3 (200) and the storage device controlling apparatus 100 is performed via the LAN 400 according to, for example, TCP/IP protocols. The information processing apparatuses 1 to 3 (200) send the storage system 600 data access requests with specified file names (requests to input and output data in terms of files; hereinafter referred to as file access requests).

The LAN 400 is connected to a backup device 910, which is specifically a disk-based device such as magneto optical disk (MO), CD-R, or DVD-RAM, or a tape-based device such as a DAT tape, cassette tape, open tape or cartridge tape. The backup device 910 communicates with the storage device controlling apparatus 100 via the LAN 400 to store backup data for data stored in the storage device 300. Further, the backup device 910 can also be connected to the information processing apparatus 1 (200). In this case, backup data for data stored in the storage device 300 is acquired via the information processing apparatus 1 (200).

The storage device controlling apparatus 100 comprises channel controllers 1 to 4 (110). By the channel controllers 1 to 4 (110), the storage device controlling apparatus 100 communicates with the information processing apparatuses 1 to 3 (200) and the backup device 910 via the LAN 400. The channel controllers 1 to 4 (110) individually accept file access requests from the information processing apparatuses 1 to 3 (200). That is, the channel controllers 1 to 4 (110) are assigned respective network addresses on the LAN 400 (e.g., IP addresses), and each behaves as a NAS so that each channel controller can provide service as NAS to the information processing apparatuses 1 to 3 (200) as if separate NASs were present. Hereinafter, the channel controllers 1 to 4 (110) are each referred to as CHN. Thus, one storage system 600 is constructed to have the channel controllers 1 to 4 (110), which individually provide service as the NAS, and thereby NAS servers, which are operated individually on separate computers in the conventional art, are integrated into one storage system 600. Therefore, the entire storage system 600 can be managed so that various settings and controls, and maintenance such as fault management and version management are made more efficient.

Note that the channel controllers 1 to 4 (110) of the storage device controlling apparatus 100 according to the present embodiment are implemented by hardware formed on an integrally unitized circuit board and software such as an operating system (hereinafter, referred to as OS) executed by this hardware and application programs running on this OS, as described later. Thus, the functions of the storage system 600 according to the present embodiment, which are implemented as part of hardware in the conventional art, are implemented by software. Hence, the storage system 600 according to the present embodiment enables flexible system operation and can provide more finely tuned services to meet diverse and greatly varying user needs.

The information processing apparatuses 3, 4 (200) are connected to the storage device controlling apparatus 100 via a SAN (Storage Area Network) 500. The SAN 500 is a network for the storage device controlling apparatus 100 to exchange data with the information processing apparatuses 3, 4 (200) in blocks, units for managing data in the memory area provided by the storage device 300. The communication between the information processing apparatuses 3, 4 (200) and the storage device controlling apparatus 100 via the SAN 500 is performed usually according to a Fibre-Channel protocol. The information processing apparatuses 3, 4 (200) send requests to access data (hereinafter, referred to as block access requests) to the storage system 600 in blocks according to the Fibre-Channel protocol.

The SAN 500 is connected to a backup device 900 compatible with SAN, which communicates with the storage device controlling apparatus 100 via the SAN 500 to store backup data for data stored in the storage device 300.

The storage device controlling apparatus 100 comprises channel controllers 5, 6 (110). By the channel controllers 5, 6 (110), the storage device controlling apparatus 100 communicates with the information processing apparatuses 3, 4 (200) and the backup device 900 compatible with SAN via the SAN 500. Hereinafter, the channel controllers 5, 6 (110) are referred to as CHFs.

The information processing apparatus 5 (200) is connected to the storage device controlling apparatus 100 directly without a network such as the LAN 400 and the SAN 500. The information processing apparatus 5 (200) may be, for example, a mainframe computer. The communication between the information processing apparatus 5 (200) and the storage device controlling apparatus 100 is performed according to a communication protocol such as FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark). The information processing apparatus 5 (200) sends the storage system 600 block access requests according to the communication protocol.

The storage device controlling apparatus 100 communicates with the information processing apparatus 5 (200) by the channel controllers 7, 8 (110). Hereinafter, the channel controllers 7, 8 (110) are referred to as CHAs.

The SAN 500 is connected to another storage system 610 installed at a place (secondary site) remote from the place (primary site) where the storage system 600 is installed. The storage system 610 is used as a unit into which data is duplicated by a function of replication or remote copy. It is noted that the storage system 610 may also be connected to the storage system 600 via a communication line such as ATM, instead of the SAN 500. In this case, a channel controller 110 provided with an interface (channel extender) for using the abovementioned communication line is adopted.

According to the present embodiment, by installing CHNs 110, CHFs 110, and CHAs 110 together in the storage system 600, a storage system connected to different types of networks can be implemented. Specifically, the storage system 600 is a SAN-NAS integrated storage system, which is connected to the LAN 400 via CHNs 110 and to the SAN 500 via CHFS 110.

===Storage Device===

The storage device 300 comprises multiple disk drives (physical disks) and provides a memory area to the information processing apparatus 200. Data is stored in an LU, a memory area logically set on a physical memory area provided by the disk drive. Various units such as a hard disk unit, a flexible disk unit and a semiconductor memory unit can be used as the disk drive. Note that the storage device 300 can be, for example, a disk array formed of a plurality of disk drives. In this case, the memory area may be provided to the information processing apparatus 200 by the plurality of disk drives managed by a RAID.

The storage device controlling apparatus 100 and the storage devices 300 may be connected directly as shown in FIG. 1 or via a network. Alternatively, the storage devices 300 may be integrated with the storage device controlling apparatus 100.

LUs set in the storage device 300 include user LUs accessible from the information processing apparatuses 200, a system LU used for controlling a channel controller 110, and the like. Stored in the system LU is an operating system executed in a CHN 110. Each LU is made correspond to a channel controller 110, and thereby each channel controller 110 is assigned accessible LUs. In the correspondence, a plurality of channel controllers 110 can share one LU. Hereinafter, the user LU and the system LU are also referred to as a user disk and a system disk, respectively. An LU shared by a plurality of channel controllers 110 is referred to as a shared LU or a shared disk. One example of the shared LU is a fault management LU that is defined in order to share the fault information between a plurality of channel controllers 110. Another example of the shared LU is a cluster LU that is defined in order to share cluster management information between a plurality of channel controllers when they make up a cluster to be managed as a set and provide redundancy. Since the purpose of defining shared LUs and system LUs is to manage the system itself by the channel controllers, the shared LUs or system LUs need not be accessed by information processing apparatuses 200, while user LUs can be accessed by information processing apparatuses 200.

===Storage Device Controlling Apparatus===

The storage device controlling apparatus 100 comprises the channel controllers 110, a shared memory 120, a cache memory 130, disk controllers 140, a managing terminal 160, and a connecting section 150.

The channel controller 110 comprises a communication interface to communicate with the information processing apparatuses 200 and a function to receive data input and output commands, etc., from the information processing apparatuses 200. For example, the CHNs 110 accept file access requests from the information processing apparatuses 1 to 3 (200) and obtain the memory addresses and data lengths of the files to output I/O requests corresponding to the file access requests so as to access storage devices 300. Accordingly, the storage system 600 can provide service as a NAS to the information processing apparatuses 1 to 3 (200). Note that the I/O request includes the top address, data length, and type of access such as read or write, of data. When data is to be written, the I/O request may include data to be written. I/O requests are outputted by an I/O processor 119 described later. The CHFs 110 accept block access requests from the information processing apparatuses 3, 4 (200) according to the Fibre-Channel protocol. Thus, the storage system 600 can provide high-speed accessible data storage service to the information processing apparatuses 3, 4 (200). The CHAs 110 accept block access requests from the information processing apparatus 5 (200) according to a protocol such as FICON, ESCON, ACONARC, or FIBARC. Accordingly, the storage system 600 can provide data storage service to the information processing apparatus 5, a mainframe computer.

The channel controllers 110 and the managing terminal 160 are connected by an internal LAN 151. Accordingly, micro-programs, etc., executed by the channel controllers 110 can be sent from the managing terminal 160 and installed therein. The construction of the channel controllers 110 is described later.

The connecting section 150 connects the channel controllers 110, the shared memory 120, the cache memory 130, and the disk controllers 140. Data and commands are sent and received to and from the channel controllers 110, the shared memory 120, the cache memory 130, and the disk controllers 140 via the connecting section 150. The connecting section 150 is constituted by, for example, a high-speed bus such as a superfast cross bus switch which transmits data by high-speed switching. Since the channel controllers 110 are connected each other by the high-speed bus, the communication performance between the channel controllers 110 is greatly improved over the conventional construction where the NAS servers operating on individual computers are connected via a LAN. This enables a high-speed file sharing function, high-speed fail-over, and the like.

The shared memory 120 and the cache memory 130 are memories shared by the channel controllers 110 and the disk controllers 140. The shared memory 120 is mainly used to store control information, commands, etc., while the cache memory 130 is mainly used to store data.

For example, when a data input and output command received by a channel controller 110 from an information processing apparatus 200 is a write command, the channel controller 110 writes the write command into the shared memory 120 and data received from the information processing apparatus 200 into the cache memory 130. Meanwhile, the disk controllers 140 are monitoring the shared memory 120. When the disk controllers 140 detect that the write command has been written into the shared memory 120, one of the disk controllers 140 reads the data from the cache memory 130 and writes the data into a relevant storage device 300 according to the command.

When a data input and output command received by a channel controller 110 from an information processing apparatus 200 is a read command, the channel controller 110 writes the read command into the shared memory 120 and checks whether to-be-read data is present in the cache memory 130. If the data is present in the cache memory 130, the channel controller 110 sends the data to the information processing apparatus 200. On the other hand, if the to-be-read data is not present in the cache memory 130, a disk controller 140 monitoring the shared memory 120 detects that the read command has been written into the shared memory 120 and reads the to-be-read data from a relevant storage device 300 to write the data into the cache memory 130 and a notice thereof in the shared memory 120. Thereafter, when the channel controller 110 detects that the to-be-read data has been written into the cache memory 130 by monitoring the shared memory 120, the channel controller 110 sends the data to the information processing apparatus 200.

Note that other than the construction where instructions to write and read data are indirectly sent from the channel controller 110 to the disk controller 140 via the shared memory 120, for example, the storage device controlling apparatus 100 may have construction where instructions to write and read data are sent directly from a channel controller 110 to a disk controller 140 without the shared memory 120.

A disk controller 140 controls a storage device 300. For example, as described above, according to a data write command received from an information processing apparatus 200, a channel controller 110 writes the data into the storage device 300. Further, a request sent from the channel controller 110 to access data in an LU designated by a logical address is converted into a request to access data in a physical disk designated by a physical address. If the physical disks in the storage device 300 are managed by RAID, data is accessed according to the structure of the RAID. Moreover, the disk controller 140 controls management of the duplication and backup of data stored in the storage device 300. Furthermore, the disk controller 140 controls to store duplication of data in the storage system 600 at the primary site into another storage system 610 installed in the secondary site (a replication or remote copy function) for the purpose of preventing data loss in the occurrence of disaster (disaster recovery).

The disk controllers 140 and the managing terminal 160 are connected each other via the internal LAN 151 and can communicate with each other. This enables micro-programs, etc., executed by the disk controllers 140 to be sent from the managing terminal 160 and installed therein. The construction of the disk controllers 140 is described later.

In the present embodiment, the shared memory 120 and the cache memory 130 are provided separately from the channel controllers 110 and the disk controllers 140. The present embodiment is not limited to this case. It is also preferable that the shared memory 120 or the cache memory 130 be dispersed to be provided in each of the channel controllers 110 and the disk controllers 140. In this case, the connecting section 150 connects the channel controllers 110 and the disk controllers 140, which have dispersed shared memories or cache memories.

===Managing Terminal===

The managing terminal 160 is a computer for maintaining and managing the storage system 600. By operating the managing terminal 160, it is possible to set the structure of the physical disks and LUs in the storage device 300 and install micro-programs executed by the channel controllers 110. Herein, in the setting of the structure of the physical disks in the storage device 300, for example, physical disks can be added or removed, and the RAID structure can be changed (e.g., a change from. RAID1 to RAID5). Further, via the managing terminal 160, it is possible to perform various operations, including: confirming the operation state of the storage system 600; identifying a fault section; and installing operating systems executed by the channel controllers 110. Yet further, the managing terminal 160 is connected to an external maintenance center via a LAN, a telephone line, etc., so that it is possible to monitor faults in the storage system 600 and quickly deals with faults when occurred by use of the managing terminal 160. The occurrence of faults is notified by, for example, OSs, application programs, driver software, etc. The faults are notified through a HTTP protocol, a SNMP (Simple Network Management Protocol), e-mails and the like. These are set and controlled by an operator and the like via a Web page serving as a user interface provided by a Web server operating on the managing terminal 160. The operator and the like can also designate objects subjected to fault monitoring and set its contents and targets to be notified of faults.

The managing terminal 160 can be incorporated into the storage device controlling apparatus 100 or attached thereto externally. Further, the managing terminal 160 may be a computer which exclusively maintains and manages the storage device controlling apparatus 100 and the storage devices 300 or a general-purpose computer having a maintenance and management function.

Figures 2, 3, 4:
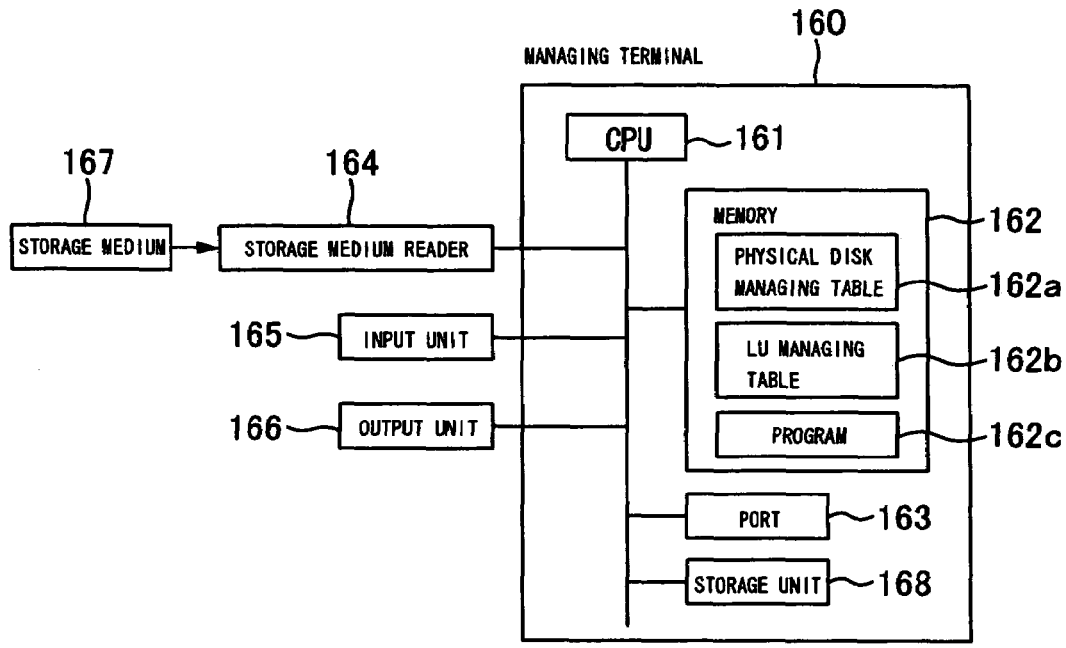
FIG. 2 is a block diagram showing the construction of a managing terminal according to the present embodiment.
FIG. 3 is a view showing a physical disk managing table according to the present embodiment.
FIG. 4 is a view showing a logical unit (LU) managing table according to the present embodiment.

FIG. 2 is a block diagram showing the construction of the managing terminal 160.

The managing terminal 160 comprises a CPU 161, a memory 162, a port 163, a storage medium reader 164, an input unit 165, an output unit 166, and a storage unit 168.

The CPU 161 controls the whole managing terminal 160 and implements functions and the like as the abovementioned Web server, etc., by executing a program 162c stored in the memory 162. The memory 162 stores a physical disk managing table 162a, an LU managing table 162b, and the program 162c.

The physical disk managing table 162a is a table for managing the physical disks (disk drives) provided in a storage device/storage devices 300, and is shown in FIG. 3. In FIG. 3, of the multiple physical disks provided in the storage device/storage devices 300, disk numbers #001 to #006 are shown. The capacity, RAID structure, and usage state of each physical disk are shown.

The LU managing table 162b is a table for managing the LUs set logically on the abovementioned physical disks, and is shown in FIG. 4. In FIG. 4, of the multiple LUs set in the storage device 300, LU numbers #1 to #3 are shown. The physical disk number, capacity, and RAID structure of each LU are shown.

The storage medium reader 164 is a unit for reading programs and data stored in a storage medium 167. Read programs and data are stored in the memory 162 or the storage unit 168. Accordingly, for example, the program 162c recorded in the storage medium 167 can be read by use of the storage medium reader 164 and stored in the memory 162 or the storage unit 168. A flexible disk, a CD-ROM, a semiconductor memory, etc., can be used as the storage medium 167. The storage medium reader 164 can be incorporated into the managing terminal 160 or attached thereto externally. The storage unit 168 is, for example, a hard disk unit, flexible disk unit, and a semiconductor memory unit. The input unit 165 is used by an operator, etc., to enter data, etc., into the managing terminal 160. Used as the input unit 165 is, for example, a keyboard, or a mouse. The output unit 166 is a unit for outputting information to the outside. Used as the output unit 166 is, for example, a display, or a printer. The port 163 is connected to the internal LAN 151, and thereby the managing terminal 160 can communicate with the channel controllers 110, the disk controllers 140 and the like. Further, the port 163 can be connected to the LAN 400 or a telephone line.

===Exterior Figure===

Figure 5:
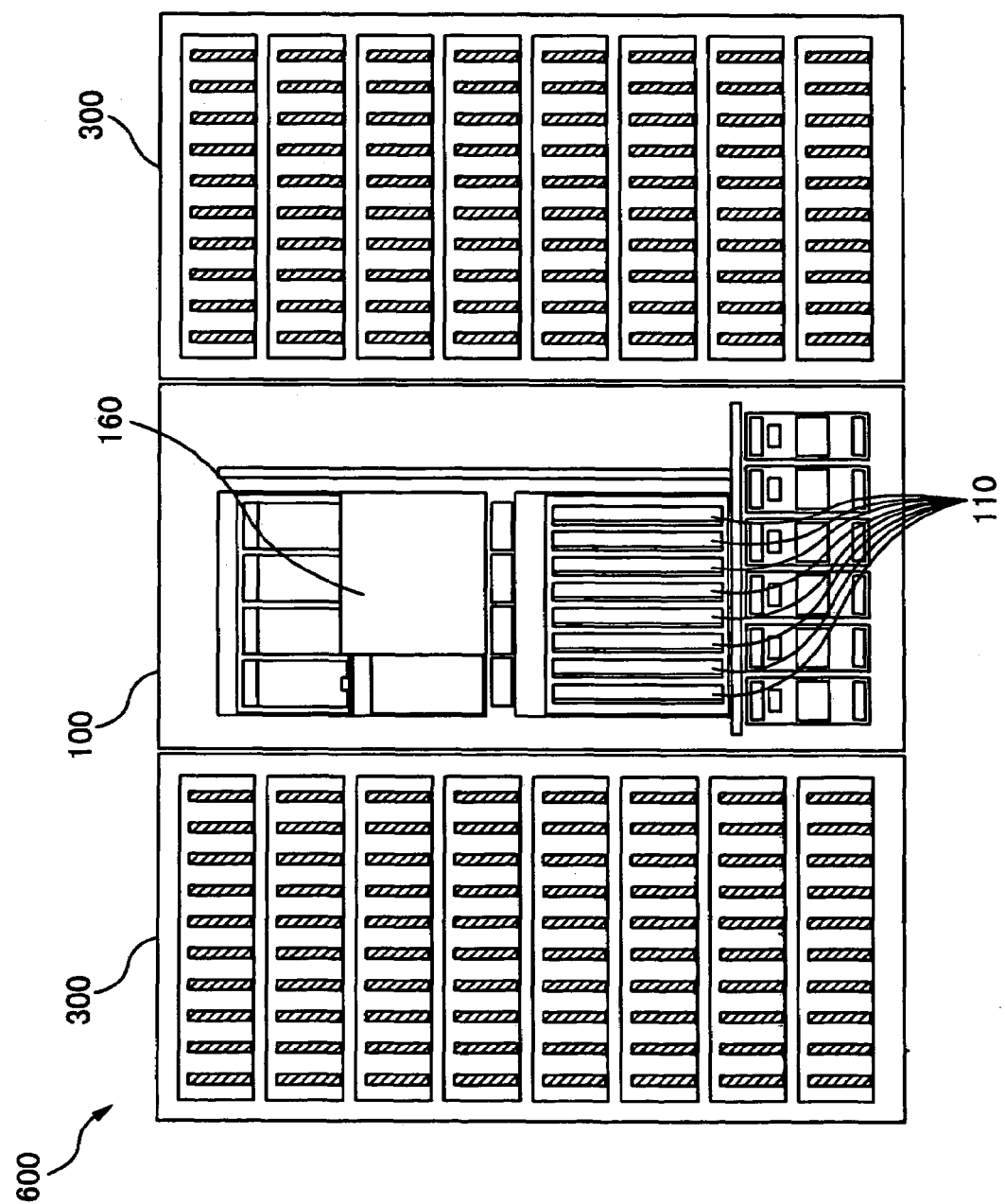
FIG. 5 is a view showing the exterior structure of the storage system according to the present embodiment.
Figure 6:
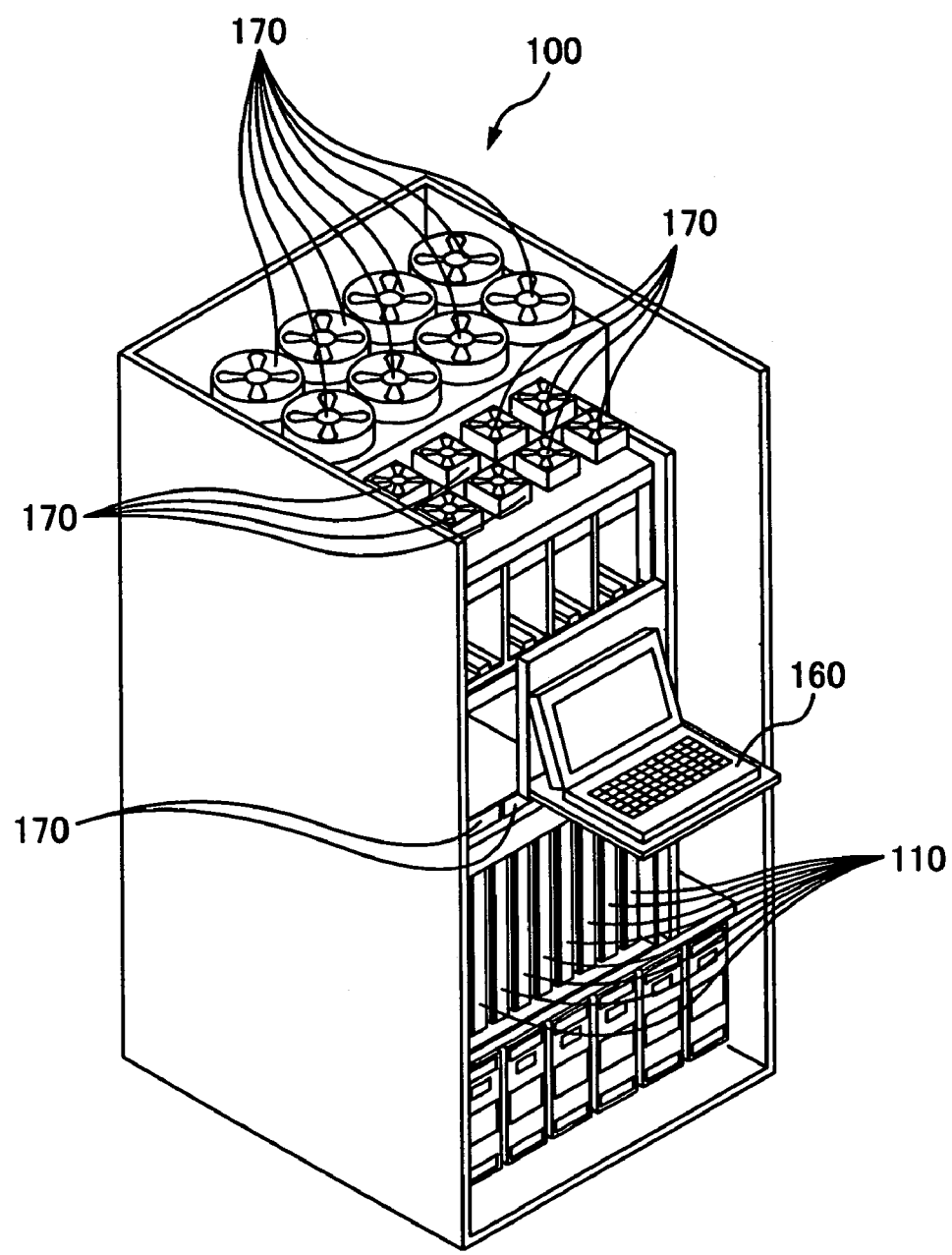
FIG. 6 is a view showing the exterior structure of a storage device controlling apparatus according to the present embodiment.

Next, FIG. 5 shows the exterior structure of the storage system 600 according to the present embodiment, and FIG. 6 shows the exterior structure of the storage device controlling apparatus 100.

As shown in FIG. 5, the storage system 600 according to the present embodiment has the storage device controlling apparatus 100 and the storage devices 300 contained in respective chassis. The chassis for the storage devices 300 are placed on both sides of the chassis for the storage device controlling apparatus 100.

The storage device controlling apparatus 100 comprises the managing terminal 160 provided at the center front. The managing terminal 160 is covered by a cover, and the managing terminal 160 can be used by opening the cover as shown in FIG. 6. Note that while the managing terminal 160 shown in FIG. 6 is a so-called notebook personal computer, it may take any form.

Provided under the managing terminal 160 are slots to which the channel controllers 110 are to be attached. The board of a channel controller 110 is attached to each slot. The storage system 600 according to the present embodiment has eight slots. FIGS. 5 and 6 show a state where the eight slots have the channel controllers 110 attached thereto. Each slot is provided with guide rails to attach a channel controller 110. By inserting the channel controller 110 into the slot along the guide rails, the channel controller 110 is attached to the storage device controlling apparatus 100. By pulling the channel controller 110 toward the front along the guide rails, the channel controller 110 can be removed. Further, provided on the surface facing forwards in the back of each slot is a connector for connecting a channel controller 110 to the storage device controlling apparatus 100 electrically. The channel controllers 110 are CHNs, CHFs, and CHAs. Since each channel controller 110 is compatible with the others in size and in the position and pin arrangement of its connector and the like, the eight slots can have any channel controller 110 attached thereto. Therefore, for example, all the eight slots can have the CHNs 110 attached thereto. Alternatively, as shown in FIG. 1, the eight slots can have four CHNs 110, two CHFs 110, and two CHAs 110 attached thereto, or some of the slots may have no channel controller 110.

Figure 12:
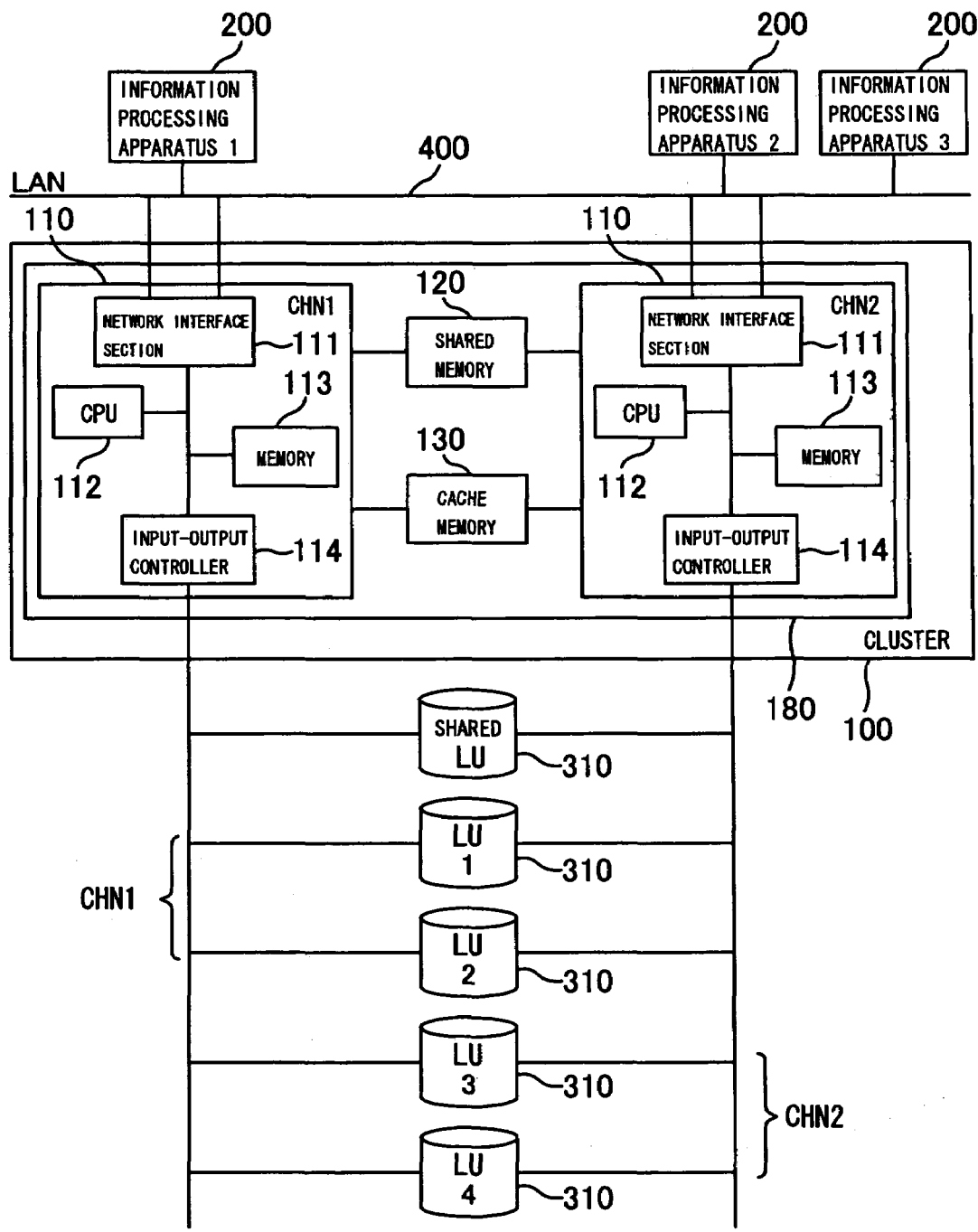
FIG. 12 is a view showing the structure of a cluster in channel controllers according to the present embodiment.

Of the channel controllers 110 attached to the slots, plural channel controllers 110 of the same type constitute a cluster. For example, two CHNs 110 as a pair may constitute a cluster. By constituting a cluster, even when a fault has occurred in a channel controller 110 of the cluster, another channel controller 110 in the cluster may be arranged to take over processing that the channel controller 110, where the fault has occurred, was performing until then (fail-over control). FIG. 12 shows two CHNs 110 constituting a cluster, which is described in detail later.

Note that the storage device controlling apparatus 100 has two systems of power supply to improve reliability, and the abovementioned eight slots, to which channel controllers 110 are attached, are divided into two groups of four for the respective power supply systems. Hence, when forming a cluster, the cluster is arranged to include channel controllers 110 respectively connected to both power supply systems. Thus, even if a failure occurs in one of the power supply systems to stop supplying electric power, electric power continues to be supplied to another channel controller 110 connected to the other power supply system forming part of the same cluster. Therefore, another channel controller 110 can take over the processing from the relevant channel controller 110 (fail-over).

Note that, as described above, while each channel controller 110 is provided as a board that can be attached to any of the slots, that is, as a unit formed on the same board, the unit may include a plurality of boards. In other words, even if a unit is formed of a plurality of boards, the concept of the same circuit board includes a group of boards that are connected each other and integrated as a unit and can be integrally attached to a slot of the storage device controlling apparatus 100.

Other units forming part of the storage device controlling apparatus 100, such as the disk controllers 140 and the shared memory 120, are not shown in FIGS. 5 and 6, but attached to the back, etc., of the storage device controlling apparatus 100.

The storage device controlling apparatus 100 is provided with fans 170 for releasing heat generated in the channel controllers 110, etc. The fans 170 are provided on the tops of the slots for the channel controllers 110 as well as on the top of the storage device controlling apparatus 100.

For example, units having conventional structures that are manufactured complying with a SAN can be used as the storage device controlling apparatus 100 and the storage devices 300 contained in respective chassis. In particular, by making the connector's shape of the CHN take such a shape that it can be directly attached to a slot provided in a conventionally structured chassis as described above, the units having conventional structures can be used more easily. The storage system 600 according to the present embodiment can be easily constructed by using the existing products.

===Channel Controller===

As described above, the storage system 600 according to the present embodiment accepts file access requests from the information processing apparatuses 1 to 3 (200) by CHNs 110, and provides service as a NAS to the information processing apparatuses 1 to 3 (200).

Figure 7:
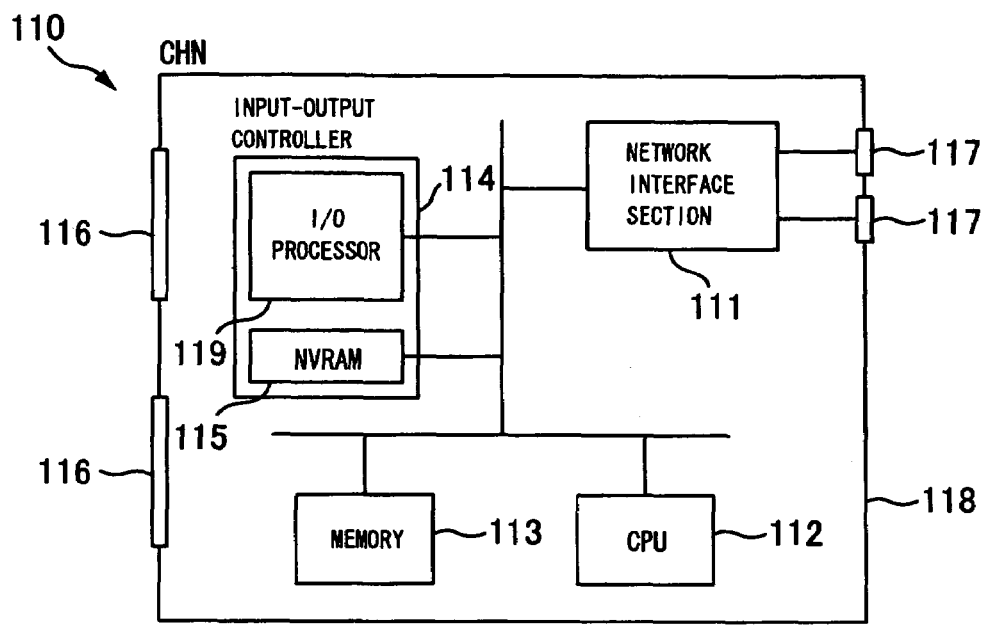
FIG. 7 is a view showing a CHN according to the present embodiment.

The hardware structure of a CHN 110 is shown in FIG. 7. As shown in FIG. 7, the CHN 110's hardware is constituted as a unit. Hereinafter, this unit is referred to as a NAS board. The NAS board includes one or more circuit boards 118. More specifically, the NAS board comprises a network interface section 111, a CPU 112, a memory 113, an input-output controller 114, an I/O (Input/Output) processor 119, an NVRAM (Non Volatile RAM) 115, a board connecting connector 116, and a communication connector 117, which are formed as one unit.

The network interface section 111 comprises a communication interface for communicating with the information processing apparatuses 200. In the case of a CHN 110, the communication interface receives file access requests sent from the information processing apparatuses 200 according to, for example, TCP/IP protocols. The communication connector 117 is a connector for communicating with the information processing apparatuses 200. In the case of a CHN 110, the communication connector is a connector that can be connected to the LAN 400 and complies with, for example, Ethernet (registered trademark).

The CPU 112 controls the CHN 110 to function as a NAS board.

Figure 9:
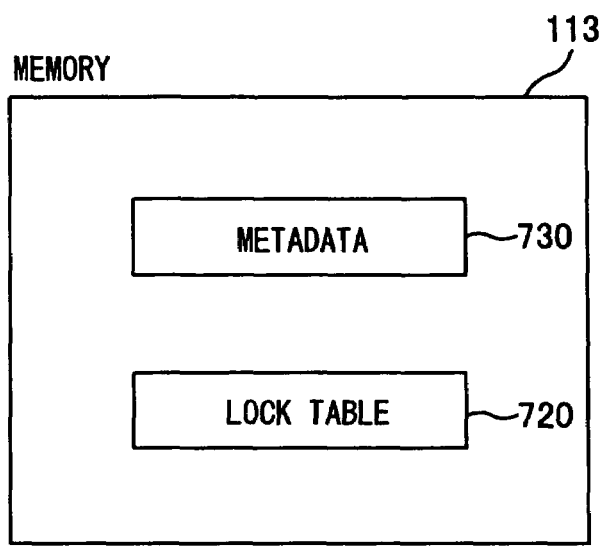
FIG. 9 is a view for explaining the contents of data stored in a memory according to the present embodiment.
Figure 11:
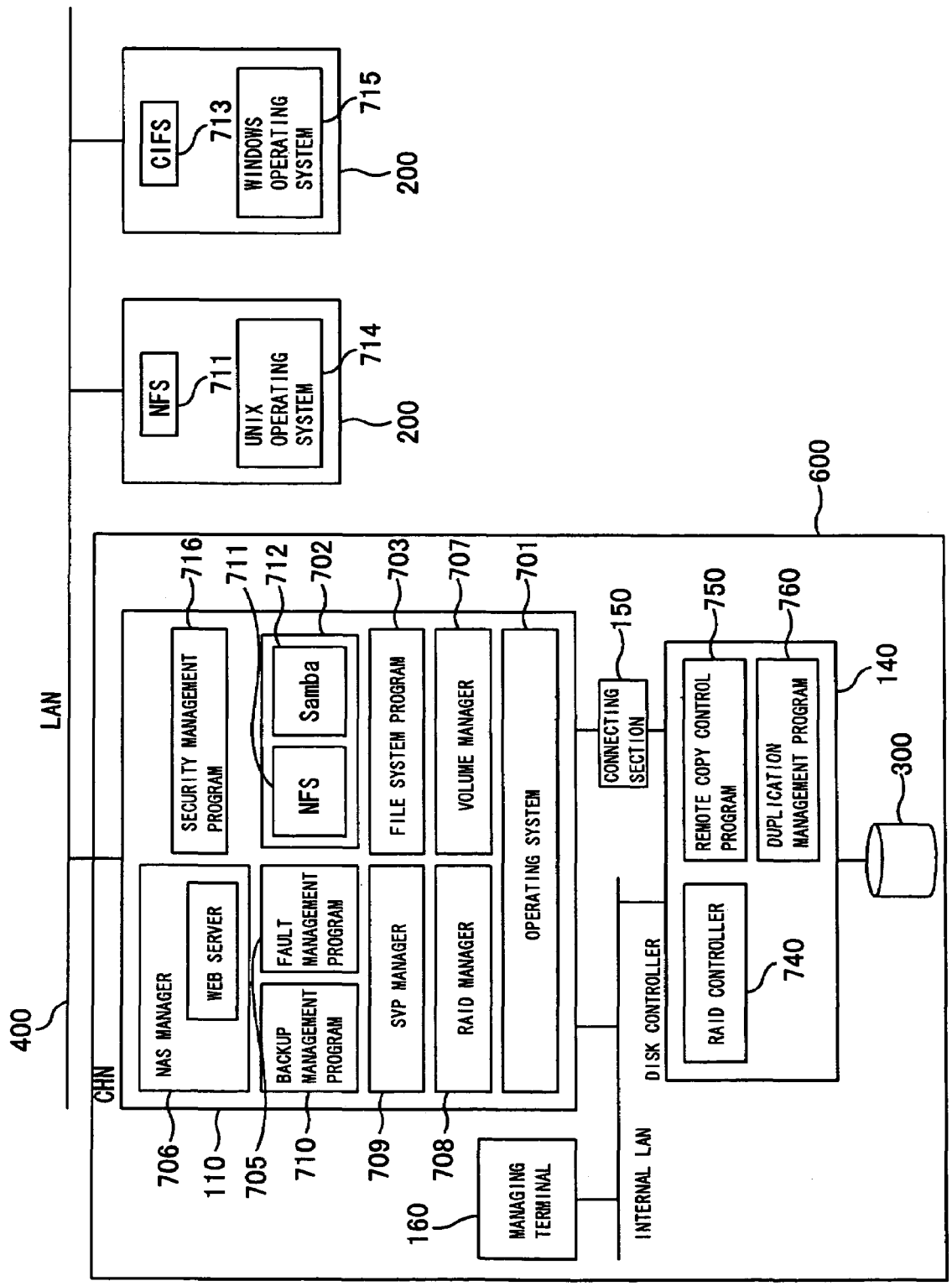
FIG. 11 is a view showing the structure of software according to the present embodiment.

The memory 113 stores various programs and data. For example, metadata 730 and a lock table 720 shown in FIG. 9 and various programs such as a NAS manager 706 shown in FIG. 11 are stored. The metadata 730 is information created for files managed by a file system. The metadata 730 includes information for identifying the storage location of each file such as the address on an LU where the file data is stored and the data size. The metadata 730 may also include the capacity, owner, update time, etc., of each file. Further, the metadata 730 may be created not only for files but also for directories. An example of the metadata 730 is shown in FIG. 13. The metadata 730 is also stored in each LU in the storage device 300.

The lock table 720 is a table for performing exclusive control on file accesses from the information processing apparatuses 1 to 3 (200). With exclusive access control, the information processing apparatuses 1 to 3 (200) can share files. The lock table 720 is shown in FIG. 14. As shown in FIG. 14, the lock table 720 includes a file lock table 721 and an LU lock table 722. The file lock table 721 is a table for indicating whether it is locked for each file. When an information processing apparatus 200 has opened a file, the file is locked, to which access from other information processing apparatuses 200 is prohibited. The LU lock table 722 is a table for indicating whether it is locked for each LU. When an information processing apparatus 200 is accessing an LU, the LU is locked, to which access from other information processing apparatuses 200 is prohibited.

The input-output controller 114 sends and receives data and commands to and from the disk controllers 140, the cache memory 130, the shared memory 120, and the managing terminal 160. The input-output controller 114 comprises the I/O processor 119 and the NVRAM 115. The I/O processor 119 is constituted by, for example, a one-chip micro-computer. The I/O processor 119 controls the sending and receiving of data and commands and relays communication between the CPU 112 and the disk controllers 140. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 8:
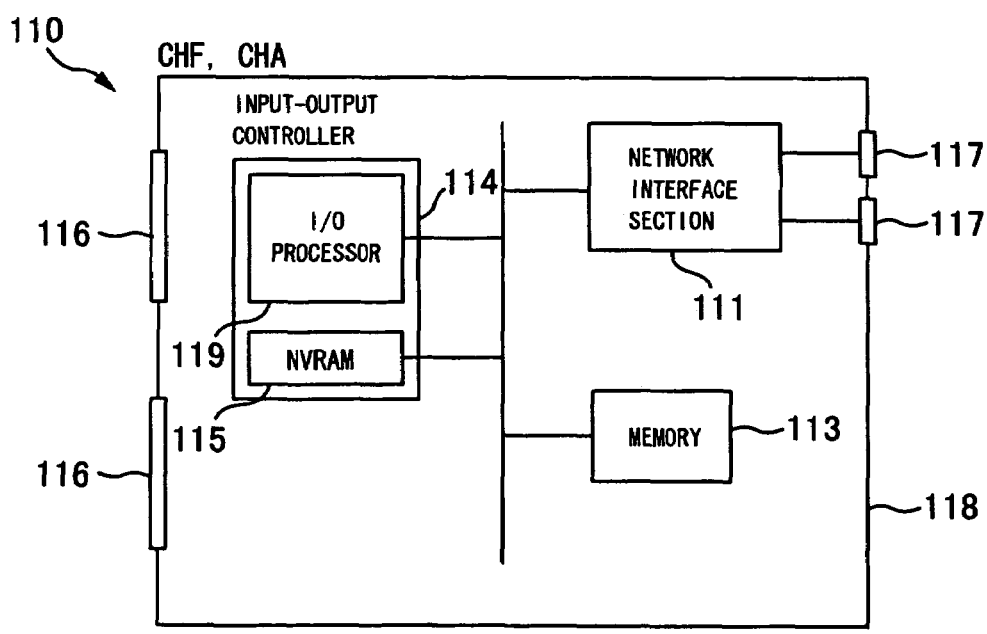
FIG. 8 is a view showing a CHF and CHA according to the present embodiment.

Next, the structures of the CHF 110 and CHA 110 are shown in FIG. 8. The CHF 110 and the CHA 110 are also formed as units in the same way as the CHN 110. Similar to the CHN 110, this unit may be constructed from a plurality of circuit boards 118. Further, the CHF 110 and the CHA 110 are compatible with the CHN 110 in terms of size and the position and pin arrangement of the board connecting connector 116 and the like.

The CHF 110 and the CHA 110 comprise a network interface section 111, a memory 113, an input-output controller 114, an I/O processor 119, an NVRAM (Non Volatile RAM) 115, a board connecting connector 116, and a communication connector 117.

The network interface section 111 comprises a communication interface for communicating with the information processing apparatuses 200. In the case of a CHF 110, the communication interface receives block access requests sent from the information processing apparatuses 200 according to, for example, the Fibre Channel protocol. In the case of a CHA 110, the communication interface receives block access requests sent from the information processing apparatuses 200 according to, for example, FICON (registered trademark), ESCON (registered trademark), ACONARC (registered trademark), or FIBARC (registered trademark) protocol. The communication connector 117 is a connector for communicating with the information processing apparatuses 200. In the case of a CHF 110, the communication connector 117 is a connector that can be connected to the SAN 500 and complies with, for example, the Fibre Channel. In the case of a CHA 110, the communication connector 117 is a connector that can be connected to the information processing apparatus 5 and complies with, for example, FICON (registered trademark), ESCON (registered trademark), ACONARC (registered trademark), or FIBARC (registered trademark).

The input-output controllers 114 control the whole respective CHFs 110 and CHAs 110 and send and receive data and commands to and from the disk controllers 140, the cache memory 130, the shared memory 120, and the managing terminal 160. By executing various programs stored in the memory 113, the functions of the CHFs 110 and CHAs 110 according to the present embodiment are implemented. The input-output controller 114 comprises the I/O processor 119 and the NVRAM 115. The I/O processor 119 controls the sending and receiving of data and commands. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 10:
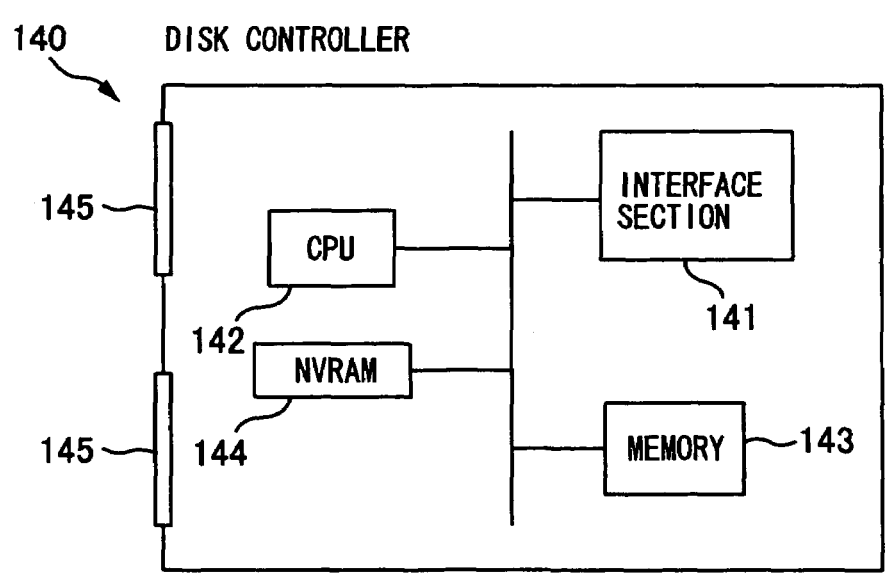
FIG. 10 is a view showing a disk controller according to the present embodiment.

Next, the structure of the disk controllers 140 is shown in FIG. 10.

The disk controller 140 comprises an interface section 141, a memory 143, a CPU 142, an NVRAM 144, and a board connecting connector 145, which are formed integrally as a unit.

The interface section 141 comprises a communication interface for communicating with the channel controllers 110, etc., via the connecting section 150, and a communication interface for communicating with the storage device 300.

The CPU 142 controls the entire disk controller 140 and communicates with the channel controllers 110, the storage device 300, and the managing terminal 160. By executing various programs stored in the memory 143 and the NVRAM 144, the functions of the disk controller 140 according to the present embodiment are implemented. The functions implemented by the disk controller 140 are the control of the storage device 300, RAID control, and duplication management, backup control, remote copy control, and the like of data stored in the storage device 300.

The NVRAM 144 is a nonvolatile memory storing a program to control the CPU 142. The contents of a program stored in the NVRAM 144 can be written or rewritten according to instructions from the managing terminal 160 or the NAS manager 706 described later.

The disk controller 140 comprises the board connecting connector 145. By engaging the board connecting connector 145 with the connector on the storage device controlling apparatus 100, the disk controller 140 is connected electrically with the storage device controlling apparatus 100.

Next, the structure of software in the storage system 600 according to present embodiment is shown in FIG. 11.

Running on an operating system 701 is software including a RAID manager 708, a volume manager 707, a service processor (SVP) manager 709, a file system program 703, a network controller 702, a backup management program 710, a fault management program 705, and an NAS manager 706.

The RAID manager 708 running on the operating system 701 provides functions to set parameters for RAID controllers 740 and to control the RAID controllers 740. The RAID manager 708 accepts parameters and control instructions information from the operating system 701, and other applications and the SVP running on the operating system 701, sets the accepted parameters into a RAID controller 740, and sends the RAID controller 740 control commands corresponding to the control instruction information.

Herein, the set parameters include, for example, parameters for defining storage devices (physical disks) forming a RAID group (specifying RAID group's structure information, stripe size, etc.), a parameter for setting a RAID level (e.g., 0, 1, or 5), and the like. Examples of the control commands which the RAID manager 708 sends to a RAID controller 740 are commands instructing to configure and delete a RAID and to change the capacity thereof, and a command requesting structure information of each RAID group.

The volume manager 707 provides virtualized logical volumes, into which LUs provided by the RAID controller 740 are further virtualized, to the file system program 703. A virtualized logical volume is composed of more than one logical volume.

The main function of the file system program 703 is to manage the correspondence between file names designated in file access requests received by the network controller 702 and addresses on virtualized logical volumes in which the files are stored. For example, the file system program 703 identifies the address on a virtualized logical volume corresponding to a file name designated by a file access request.

The network controller 702 comprises two file system protocols, a NFS (Network File System) 711 and a Samba 712. The NFS 711 accepts a file access request from a UNIX (registered trademark)-based information processing apparatus 200 on which the NFS 711 runs. In various embodiments, UNIX-based information processing apparatus 200 runs a version of a UNIX operating system 714. On the other hand, the Samba 712 accepts a file access request from a Windows (registered trademark)-based information processing apparatus 200 on which a CIFS (Common Interface File System) 713 runs. In various embodiments, Windows-based information processing apparatus 200 runs a version of a Windows operating system 715.

The NAS manager 706 is a program for confirming, setting, and controlling the operation state of the storage system 600. The NAS manager 706 has a function as a Web server and provides a setting Web page for the information processing apparatuses 200 to set and control the storage system 600. In response to HTTP (HyperText Transport Protocol) requests from the information processing apparatuses 1 to 3 (200), the NAS manager 706 sends data of the setting Web page to the information processing apparatuses 1 to 3 (200). By use of the setting Web page displayed in the information processing apparatuses 1 to 3 (200), a system administrator, etc., instructs to set and control the storage system 600. Things that can be done by use of the setting Web page are, for example, LU management and setting (capacity management, capacity expansion and reduction, user assignment, etc.); the setting and control (setting of the addresses of the to-be-copied and the to-be-copied-into) concerning functions such as duplication management and remote copy (replication); the setting and control of the backup management program 710 described later; the management of redundantly structured clusters of CHNs, CHFs and CHAs (setting of the correspondence between the channel controllers, whereby, when one fails, another fails over; a fail-over method; etc.); version management of the OS and application programs running on the OS; and the management and setting of the operation state of a security management program 716 and update management (version management) of the security management program 716 providing functions concerning security of data, such as a virus detection program and virus extermination. The NAS manager 706 receives data concerning settings and controls sent from an information processing apparatus 200 due to the operation of the setting Web page and performs the settings and controls corresponding to the data. Thus, various settings and controls of the storage system 600 can be performed from the information processing apparatuses 1 to 3 (200).

The backup management program 710 is a program for backing up data stored in the storage devices 300 via LAN or SAN. The backup management program 710 provides a function of an NDMP (Network Data Management) protocol and communicates, according to the NDMP, with backup software complying with the NDMP operating on an information processing apparatus 200 via the LAN 400. When a backup device 910 is connected to the information processing apparatus 200 via a SCSI, etc., data to be backed up is once read by the information processing apparatus 200 and sent to the backup device 910. When the backup device 910 is connected to the LAN 400, data to be backed up may be transferred to the backup device 910 from the storage system 600 directly without an information processing apparatus 200.

The fault management program 705 is a program for controlling fail-over between the channel controllers 110 which form a cluster.

The SVP manager 709 provides the managing terminal 160 with various services according to requests from the managing terminal 160. For example, the SVP manager 709 provides the managing terminal 160 with the contents of various settings concerning the storage system 600 such as the settings of LUs or RAIDs and makes reflected therein the various settings concerning the storage system 600 entered from the managing terminal 160.

The security management program 716 implements functions of detecting computer viruses, monitoring invasion, update management of a computer virus detection program, extermination of viruses infected a computer, firewall, and the like.

Next, FIG. 12 shows a cluster 180 constituted of two CHNs 110. FIG. 12 shows a case where the cluster 180 is composed of a CHN 1 (channel controller 1) 110 and a CHN 2 (channel controller 2) 110.

As previously mentioned, the fail-over processing is performed between the channel controllers 110 constituting the cluster 180. That is, if any fault occurs in CHN 1 (110) and it becomes impossible to continue a processing, the CHN 2 (110) takes over the processing that has been performed by the CHN 1 (110). The fault management program 705 executed by the CHN 1 (110), and the CHN 2 (110) implements the fail-over processing.

Both CHN 1 (110) and CHN 2 (110) execute the fault management program 705, write in the shared memory 120 to indicate that the processing thereof is normally performed, and confirm each other whether the other has written. When one cannot detect the writing by the other, the one determines that a fault has occurred in the other and performs fail-over processing. In the fail-over processing, the processing that has been performed by the other is taken over via a shared LU 310.

Further, the file access processing section of each of CHNs 110 forming the cluster 180 can manage the accessible information processing apparatus 1 to 3 (200). Accordingly, it can be achieved that only when a file access request is sent from the accessible information processing apparatus 1 to 3 (200), the CHN accepts the file access request. The accessible information processing apparatus 1 to 3 (200) is managed by recording the domain name of the IP address of the information processing apparatus 1 to 3 (200), which is allowed to access, in each CHN 110's memory 113 beforehand.

Thus, even when the information processing apparatuses 1 to 3 (200) are connected to the storage system 600 via common LAN 400, LUs can be assigned exclusively to the information processing apparatuses 1 to 3 (200), respectively. For example, when the information processing apparatuses 1 to 3 (200) are computers of respective different enterprises, storage service in which data confidentiality is maintained from the others can be provided to each of the information processing apparatuses 1 to 3 (200).

The abovementioned settings of each CHN 110 can be performed from the managing terminal 160 and the information processing apparatuses 1 to 3 (200). When the information processing apparatuses 1 to 3 (200) perform the settings, the information processing apparatuses 1 to 3 (200) use the setting Web page displayed in the information processing apparatuses 1 to 3 (200) by the NAS manager 706 running on the CHN 110 to do so.

===Installing Processing===

Next, a description is given of installing software necessary to make the storage system 600 according to the present embodiment function as a NAS.

In order to make the storage system 600 function as a NAS, an OS 701 executed by CHNs 110 needs to be installed. Micro-programs (firmware) executed by the CHNs 110 and the disk controllers 140 need to be also installed. Application programs such as the volume manager 707, the file system program 703, and the NAS manager 706 are also installed in the CHNs 110 as necessary. A remote copy control program 750, a duplication management program 760, etc., are installed in the disk controllers 140 as necessary.

The OS 701 and the application programs are stored in system LUs set in a storage device/storage devices 300. An OS installed area, a memory area for detecting faults, a memory area for cluster information, etc., may be assigned to the system LUs. Stored in the memory area for detecting faults is information about fault management such as dump lists outputted by the OS 701 and the application programs (core dump, memory dump, and disk dump outputted due to abnormal terminations of OS 701's kernel and daemon, and abnormality where a processing loops between a plurality of processes). Stored in the memory area for cluster information is information needed to set clusters of CHNs 110. Thus, by setting memory areas for storing the OS 701 and the application programs in a storage device/storage devices 300, CHNs 110 does not need to have such memory areas provided therein.

Further, the memory area for detecting faults and the memory area for cluster information can be provided in a fault management LU and a cluster LU separately from the system LUs. Note that, when the storage devices 300 are operated according to a method of RAID 5, the system LUs, the fault management LU, the cluster LU and the like are preferably dispersed among a plurality of parity groups, instead of being concentrated in only one parity group. This is because important data is stored in these LUs to operate the storage device controlling apparatus 100.

Next, the procedure is described below of installing the OS 701 and the micro-programs necessary to make the storage system 600 function as a NAS. These programs are installed from the managing terminal (computer) 160.

Figure 15:
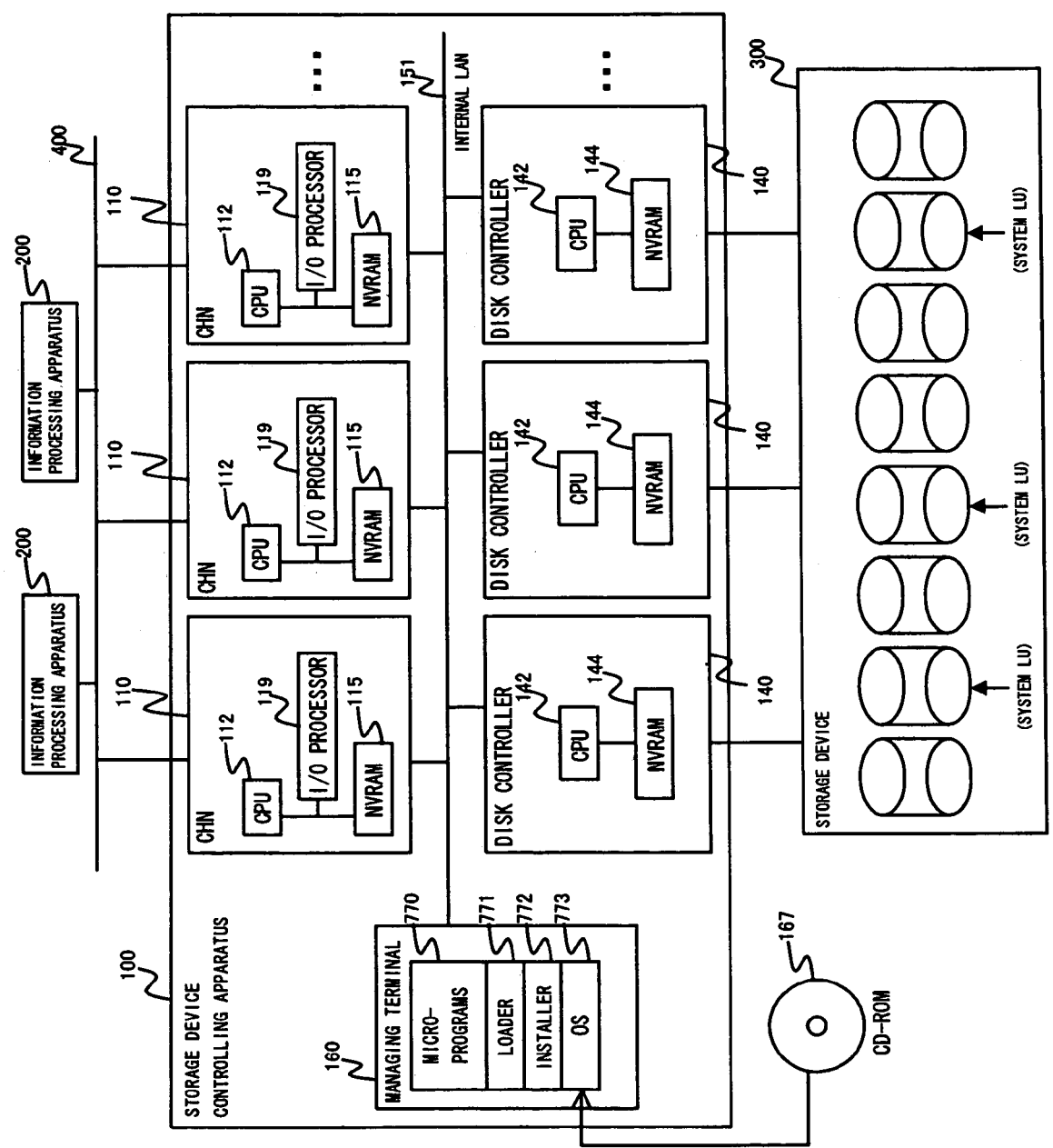
FIG. 15 is a block diagram for explaining the installing procedure according to the present embodiment.

FIG. 15 is a block diagram for explaining the procedure of the installation. FIG. 16 shows an example of the screen for the installation displayed on the output unit 166 of the managing terminal 160.

In the block diagram of FIG. 15, the storage device controlling apparatus 100 is connected to information processing apparatuses 200 via a LAN (first network) 400 and accepts file access requests from the information processing apparatuses 200. The storage device controlling apparatus 100 comprises the managing terminal 160. The managing terminal 160 is connected to CHNs 110 and the disk controllers 140 via the internal LAN (second network) 151. Micro-programs 770, a loader 771, an installer 772, and an OS 773 are stored in the managing terminal 160. These programs are stored in the memory 162 and storage unit 168 of the managing terminal 160. One of the micro-programs 770 is written into NVRAMs 115 of CHNs 110, and the other is written into NVRAMs 144 of the disk controllers 140. The former is a program for controlling I/O processors 119 of CHNs 110. The latter is a program for controlling CPUs 142 of the disk controllers 140. The loader 771 and the installer 772 are programs used for CHNs 110 to read in the OS 773 stored in the managing terminal 160. The OS 773 is installed in a system LU provided in the storage device 300 for each CHN 110. These programs can be read in from the storage medium 167 such as CD-ROM by use of the storage medium reader 164 provided to the managing terminal 160, or downloaded via the port 163 from, for example, the Internet.

Further, an example of the screen displayed on the output unit 166 of the managing terminal 160 shown in FIG. 16 is an example where CHNs 110 newly attached to slots No. 1 to 4 are set. Note that while the contents of settings for slots No. 5 to 8 are displayed in FIG. 16, those for slots already set may be for example non-displayed so that an operator cannot enter the settings thereof.

The install setup screen shown in FIG. 16 includes a slot number column, a channel adaptor selection column, a system LU number designation column, and a boot designation column. Among them, an operator can enter the channel adaptor selection column, the system LU number designation column, and the boot designation column.

The types of channel controllers 110 to be attached to the slots of the storage device controlling apparatus 100 are entered into the channel adaptor selection column. The types of channel controllers 110 are CHA, CHF, and CHN. These items can be selected by clicking on portions indicated by downward triangle marks in FIG. 16.

System LU numbers are entered into the system LU number designation column. As a system LU, any LU can be selected from LUs set in the storage device 300. A system LU is designated for each CHN 110. Note that when the storage capacity of the LU designated as a system LU is less than a given capacity, the OS 773 and the like cannot be installed in that LU. Therefore, the managing terminal 160 comprises a function of checking the capacity of LUs entered in the system LU number designation column. Note that a system LU may also be shared by a plurality of CHNs 110.

Methods of booting the channel controllers 110 are entered in the boot designation column. In the case of a via-network boot, a channel controller 110 is booted from the managing terminal 160 connected via the internal LAN 151. In the case of a disk boot, a channel controller 110 is booted from a system LU on the storage device 300. These designations can be selected by clicking with a mouse on portions indicated by downward triangle marks in FIG. 16.

After entering for slots No. 1 to 4 as shown in FIG. 16, an operator clicks on the OK button. Accordingly, the managing terminal 160 starts sequentially installing the programs in the CHNs 110 attached to slots No. 1 to 4.

Figure 18:
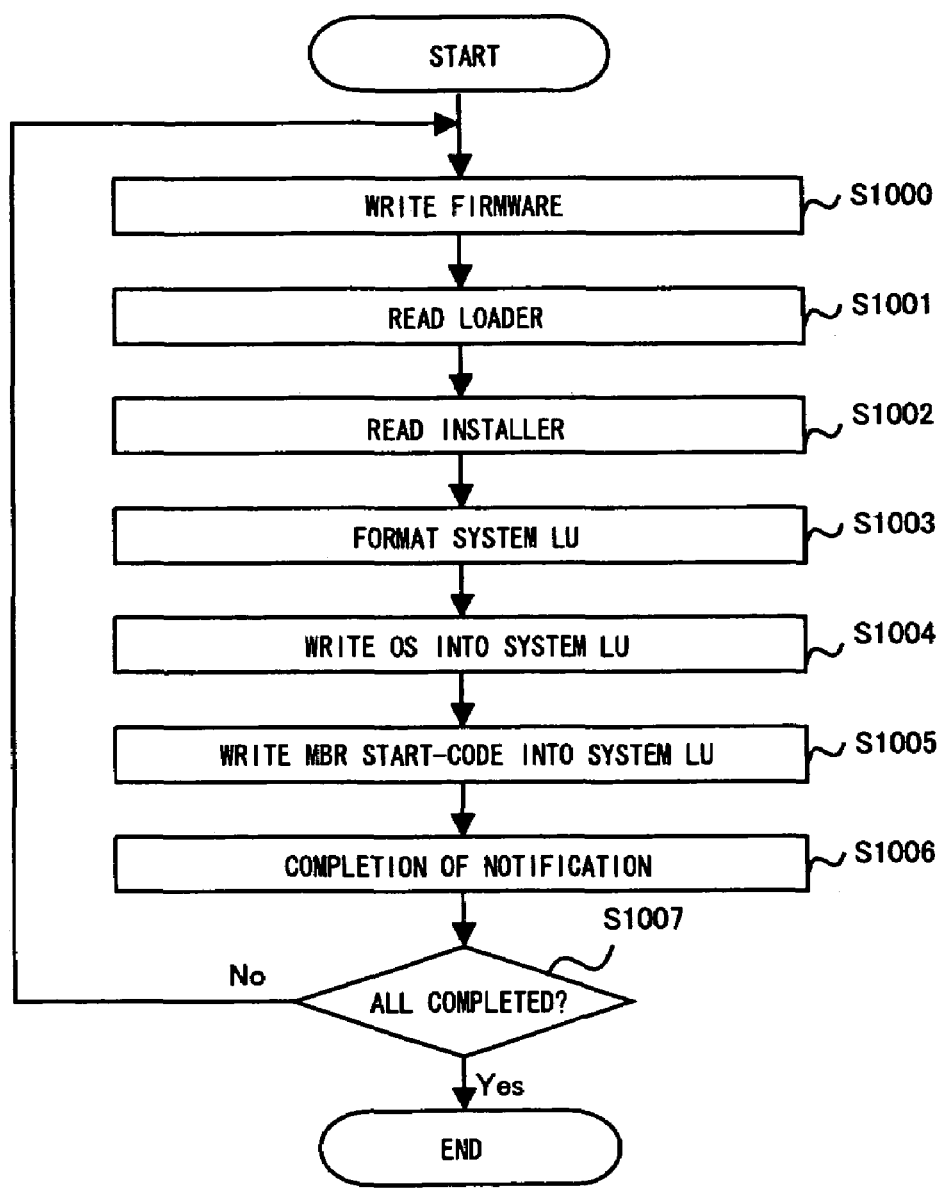
FIG. 18 is a flow chart showing the installing procedure according to the present embodiment.

The flow chart of FIG. 18 shows the installing procedure. According to instructions from an operator operating the managing terminal 160, a micro-program rewriting program executed in the managing terminal 160 stores the MAC (Media Access Control) addresses of the CHNs 110 and disk controllers 140 into which the micro-programs 770 are written in, for example, the memory 162 of the managing terminal 160, the addresses being pieces of information for identifying the CHNs 110 and disk controllers 140. The micro-programs 770 (S1000) are written into the NVRAMs 115 and 144 of CHNs 110 and disk controllers 140 identified by MAC addresses stored in the managing terminal 160, respectively. The writing is performed through the internal LAN from the managing terminal 160. Ones into which the micro-programs 770 are written can be determined based on input information from the above-mentioned install setup screen. The MAC addresses of ones into which the micro-programs 770 are written are acquired by sending a MAC address inquiry command to CHNs 110 or disk controllers 140 connected to the internal LAN 151. Note that information for identifying the CHNs 110 or disk controllers 140 stored in the managing terminal 160 is not limited to the MAC addresses but may be IP addresses or production numbers of the CHNs 110 and disk controllers 140. The micro-programs 770 may be provided by the storage medium 167 such as CD-ROM or downloaded via the Internet.

As described above, by arranging the micro-programs 770 to be written into CHNs 110 and disk controllers 140 whose MAC addresses are stored in the managing terminal 160, the micro-programs 770 can be written into only the specific CHNs 110 and disk controllers 140. In this way, the micro-programs 770 can be written into only CHNs 110 and disk controllers 140 whose the micro-program/micro-programs 770 need be rewritten. Furthermore, the micro-program 770 for the CHNs 110 can be prevented from being mistakenly loaded into CHAs 110 or CHFs 110.

Subsequently, the specific CHNs 110 and disk controllers 140 are reset, thereby making the micro-programs 770 installed start running. Herein, the reset is performed by, for example, the managing terminal 160. After the reset, the managing terminal 160 comes to be able to recognize the LUs of the storage device/storage devices 300 when the disk controllers 140 have started operating.

Next, the managing terminal 160 sends instructions to read in the loader 771 to the CHNs 110 whose MAC addresses are stored in the managing terminal 160. The loader 771 is a program executed by the CHNs 110 to read in the installer 772 from the managing terminal 160. The instructions from the managing terminal 160 to read in the loader 771 are accepted and executed by BIOS (Basic Input/Output System) in CPUs 112 of the CHNs 110, and thereby the CHNs 110 reads in the loader 771 from the managing terminal 160 (S1001).

Subsequently, the loader 771 reads in the installer 772 from the managing terminal 160 (S1002). The installer 772 provides functions to format LUs on a file system base and to write a file into an LU as well as functions concerning communications over the internal LAN 151.

Next, the installer 772 sets partitions for the system LU in order to secure an installing area for the OS 773, and formats the system LU as a file system (S1003). The installer 772 reads in the OS 773 from the managing terminal 160 and writes in files into the formatted installing area (S1004). Furthermore, the installer 772 makes the setup file for the written OS 773 reflect the network settings of the internal LAN 151.

Yet further, the installer 772 writes a starting code for a MBR (Master Boot Record) into the system LU where the OS 773 has been written, and validates MBR (S1005). Thus, the OS 773 is arranged to automatically start upon the reset of the CHN.

After the completion of the above processing, the I/O processors 119 of the CHNs 110 notify the managing terminal 160 of the completion of the installation via the internal LAN 151 (S1006).

The managing terminal 160 repeats the installing processing successively for the respective CHNs 110 of slots No. 1 to 4 (S1007). The completion of the above processing for all the CHNs 110 of slots No. 1 to 4 ends the installing processing.

By this installing method, firmware and the OS 773 can be installed smoothly in the procedure, the series of steps.

Subsequently, the CHNs are set as NASs. The settings of a CHN as a NAS include the granting of an IP address, user area settings, OS settings, and cluster settings. These settings are performed by a NAS manager 110. An IP address is granted to each of the two communication ports of each CHN 110. The user area settings are to create a file system for the user LU. The OS settings are to set a mount point on the file system created for the user LU and to perform user definitions, group definitions, etc.

===Cluster Settings===

The cluster settings are to divide the plurality of channel controllers 110 attached to the storage device controlling apparatus 100 into groups in terms of the types of channel controllers 110. Accordingly, even when a fault occurs in a channel controller 110 in a cluster (group), another channel controller 110 in the cluster can be arranged to take over the processing that the channel controller 110, where the fault has occurred, was performing until then.

The storage system 600 according to the present embodiment comprises two systems of power supply to improve reliability. Each slot of the storage device controlling apparatus 100 is connected to one of the two systems of power supply. In setting a cluster, the cluster is arranged to include both channel controllers 110 connected respectively to the two systems of power supply. That is, the cluster is so arranged that all channel controllers 110 therein are not connected to only one of the two systems of power supply.

In this way, if a power supply system stops supplying power due to a fault therein, the other power supply system continues to supply power to another channel controller 110 in the same cluster connected thereto. Therefore, the processing is failed over to another channel controller 110.

Figure 19:
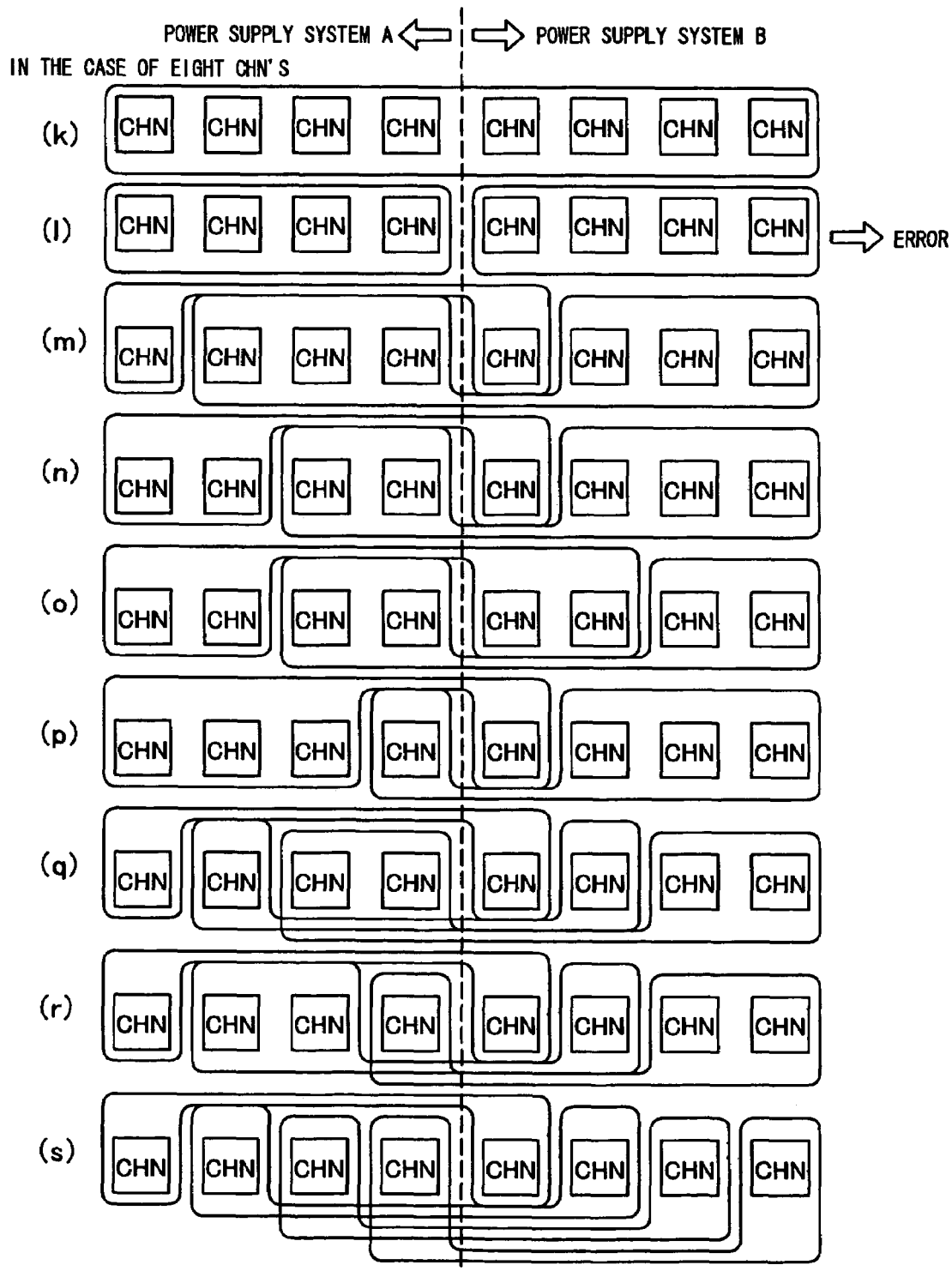
FIG. 19 is a view showing ways clusters are so set that each cluster includes channel controllers connected to a plurality of systems of power supply.
Figure 20:
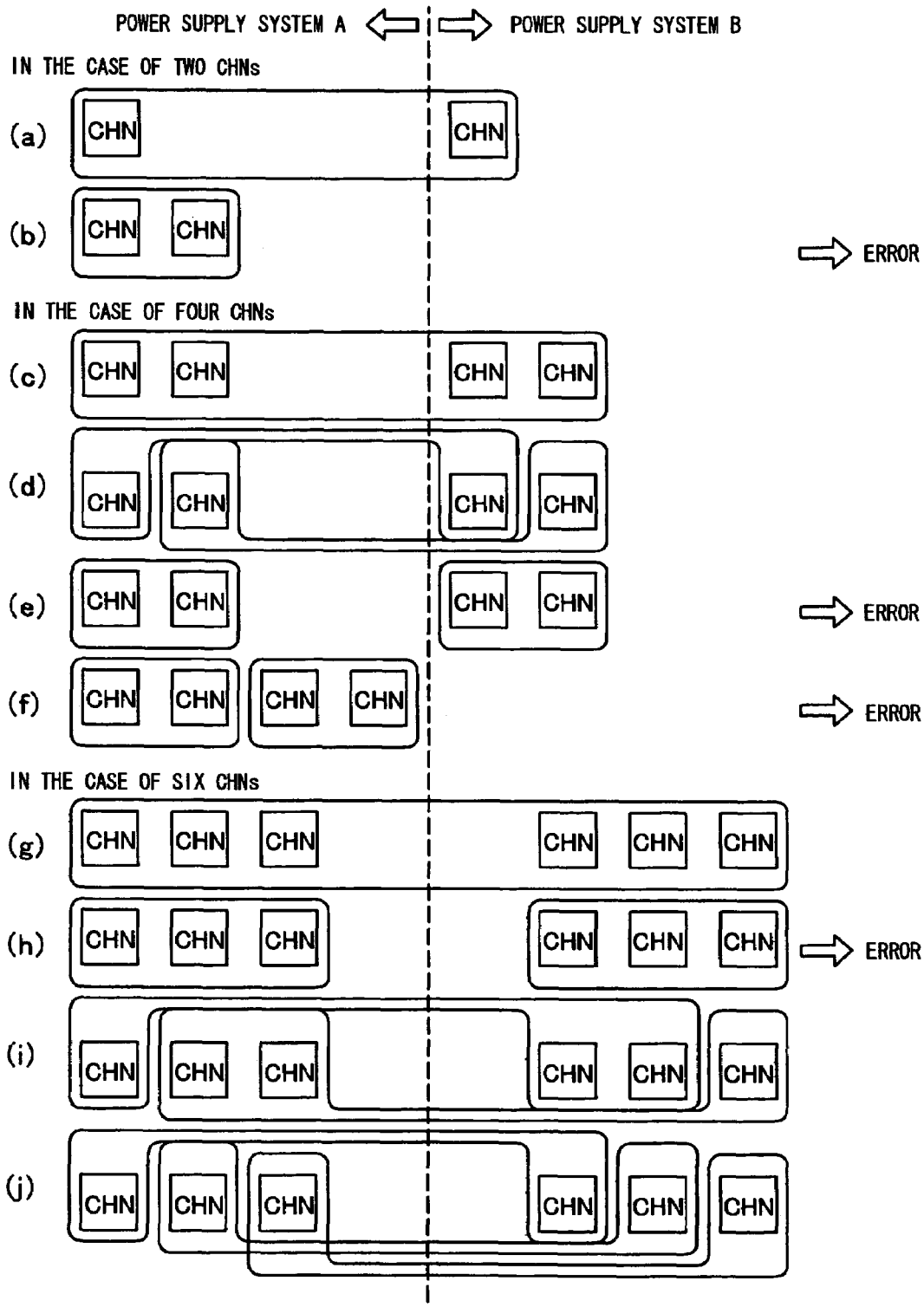
FIG. 20 is a view showing ways clusters are so set that each cluster includes channel controllers connected to a plurality of systems of power supply.

An example of the screen for setting a cluster displayed in an information processing apparatus 200 is shown in FIG. 17. FIGS. 19 and 20 show how to set a cluster so as to include both channel controllers 110 connected respectively to the two systems of power supply.

The screen for setting a cluster has a power supply system column, a slot number column, a board ID column, a board type column, a column 1 for setting the to-fail-over, a column 2 for setting the to-fail-over, and a shared LU setting column.

The power supply system column shows a power supply system of each slot. As in the example of the screen of FIG. 17, odd-numbered slots are connected to a power supply system A, and even-numbered slots are connected to a power supply system B.

The board ID column shows the board ID of the channel controller 110 attached to each slot, the board ID is, for example, a production number or IP address.

The board type column shows the type of the channel controller 110 attached to each slot, the type being of CHN, CHA, or CHF.

The column 1 for setting the to-fail-over is an input column for designating another board to fail over the processing when a fault has occurred in the board. These designations can be selected by clicking with a mouse on portions indicated by downward triangle marks in FIG. 17.

The column 2 for setting the to-fail-over is an input column for designating a second board to fail over the processing when the board designated in the column 1 for setting the to-fail-over cannot take over the processing. These designations can also be selected by clicking with a mouse on portions indicated by downward triangle marks in FIG. 17.

The shared LU setting column is an input column for designating an LU accessible from and shared among the channel controllers 110 forming the cluster. The shared LU stores take-over information, etc., needed in fail-over processing.

After entering theses inputs, an operator clicks on a set button. Accordingly, this setting information is sent to the storage device controlling apparatus 100. It is checked whether the channel controllers 110 forming the cluster are connected solely to one power supply system, A or B.

If connected solely to one power supply system A or B, a warning is outputted to the user interface provided by the information processing apparatus 200. When the information processing apparatus 200 is provided with a buzzer, the buzzer is set off. Alternatively, the display unit provided in the information processing apparatus 200 displays an error message. When the channel controllers 110 forming the cluster are connected to both power systems A and B, this setting information is stored in the memory 113 of each channel controller 110 and the shared LU, and this completes the cluster setup. Note that this setting information can be arranged to be stored in the storage area for cluster information of the system LU and the cluster LU as well. In addition, these cluster setups can be arranged to be performed from the managing terminal 160.

Next, FIGS. 19 and 20 show ways clusters are so set that each cluster includes channel controllers 110 connected to the two systems of power supply, respectively.

As previously mentioned, the storage device controlling apparatus 100 comprises the eight slots, and there is no restriction on a combination of a slot and a channel controller 110. It is also possible to attach CHFs 110, CHAs 110, and CHNs 110 together thereto. FIGS. 19 and 20 show an example of the cluster setup where only CHNs 110 are attached.

FIG. 20 shows examples where two CHNs 110 are attached, where four CHNs 110 are attached, and where six CHNs 110 are attached. As shown in FIG. 20, because the CHNs 110 forming the cluster have the same power source, the combinations (b), (e), (f), and (h) cause an error.

FIG. 19 shows examples where eight CHNs 110 are attached. Because the CHNs 110 forming the cluster have the same power source, the combination (I) causes an error.

As described above, in the storage system 600 according to the present embodiment, the cluster setup is performed such that the channel controllers 110 are not connected solely to one power supply system. Accordingly, even if a power supply system stops supplying power due to a fault therein, the processing can be failed over to another channel controller 110 in the same cluster connected to the other power supply system. Therefore, the highly applicably storage system 600 can be provided.

Although the preferred embodiment of the present invention has been described in detail, it should be understood that various changes, substitutions and alterations can be made therein without departing from the spirit and scope of the invention as defined by the appended claims.

What is claimed is:

1. A method of installing software on a storage device controlling apparatus, said method comprising:
writing software for enabling a file access processing section of a channel controller of the storage device controlling apparatus to function,
wherein said storage device controlling apparatus comprises:
a plurality of channel controllers, each having a circuit board on which are formed a file access processing section receiving requests to input and output data in files as units from an information processing apparatus via a first network and an I/O processor outputting I/O requests corresponding to said requests to input and output data to a storage device;
a plurality of disk controllers executing input and output of data into and from said storage device in response to the I/O requests sent from said I/O processor; and
a second network coupling said plurality of channel controllers and said plurality of disk controllers so as to be able to communicate with each other, wherein said software is written into said storage device by communicating with said channel controller via said second network.

2. A method of installing software on a storage device controlling apparatus according to claim 1, wherein a storage area for storing the software for enabling said file access processing section of said channel controller to function is assigned in said storage device; wherein said storage device controlling apparatus is coupled to a host via a SAN.

3. A method of installing software on a storage device controlling apparatus according to claim 1, wherein said software for enabling said file access processing section to function is software for implementing a function of an operating system that provides a function of a file system.

4. A method of installing software on a storage device controlling apparatus according to claim 1, wherein said second network is coupled to a computer, and said software is written from said computer into said storage device by said channel controller communicating with said computer, wherein said storage device controlling apparatus receives data requests in block units based on fibre channel protocol.

5. A method of installing software on a storage device controlling apparatus according to claim 1, wherein said second network is coupled to a computer, said method further comprising:
    storing, by said computer, information for identifying at least one specific channel controller with which said computer is to perform said communication from among said at least one channel controller; and
    writing said software from said computer into said storage device by said computer communicating with said at least one specific channel controller about which said information is stored in said computer.

6. A method of installing software on a storage device controlling apparatus according to claim 1, wherein the software written into the storage device enables the channel controller to function in a way that enables a storage system in which the storage device controlling apparatus is disposed to function as a Network Attached Storage (NAS).

7. A method of installing software on a storage device controlling apparatus according to claim 1, wherein the software written into the storage device comprises an operating system that enables the channel controller to function as a NAS channel controller.

8. A method of installing software on a storage device controlling apparatus according to claim 1, wherein the second network comprises an internal LAN in the storage device controlling apparatus.

9. A method of installing software on a storage device controlling apparatus according to claim 1, wherein the at least one channel controller and the at least one disk controller are further connected by a connecting section to a memory via a high-speed bus.

10. A method of installing software on a storage device controlling apparatus,
    said method comprising:
        writing a piece of firmware into each of nonvolatile memories provided for a channel controller and a disk controller of the storage device controlling apparatus,
        wherein said storage device controlling apparatus comprises:
            a plurality of channel controllers, each having a circuit board on which are formed a file access processing section receiving requests to input and output data in files as units from an information processing apparatus via a first network and an I/O processor outputting I/O requests corresponding to said requests to input and output data to a storage device I/O;
            a plurality of disk controllers executing input and output of data into and from said storage device in response to the I/O requests sent from said I/O processor; and
            a second network coupling said plurality of channel controllers and said plurality of disk controllers so as to be able to communicate with each other,
        wherein said piece of firmware is written via said second network.

11. A method of installing software on a storage device controlling apparatus according to claim 10, wherein said pieces of firmware are sent from a computer coupled to said second network to said channel controller and said disk controller, wherein said storage device controlling apparatus receives data requests in block units based on fibre channel protocol.

12. A method of installing software on a storage device controlling apparatus according to claim 10, wherein said second network is coupled to a computer, said method further comprising:
    storing, by said computer, information for identifying at least one specific channel controller and at least one specific disk controller with which said computer is to perform said communication from among said at least one channel controller and said at least one disk controller; and
    writing said pieces of firmware from said computer into said at least one specific channel controller and said at least one specific disk controller by said computer communicating with said specific channel controller and said specific disk controller about which said information is stored in said computer.

13. A method of installing software on a storage device controlling apparatus according to claim 10, wherein the firmware written into the nonvolatile memories of the channel controller and the disk controller enables the channel controller and the disk controller to function in a way that enables a storage system in which the storage device controlling apparatus is disposed to function as a Network Attached Storage (NAS).

14. A method of installing software on a storage device controlling apparatus according to claim 10, wherein the firmware written into the nonvolatile memory of the channel controller comprises a microprogram for controlling the I/O processor of the channel controller.

15. A method of installing software on a storage device controlling apparatus according to claim 10, wherein the firmware written into the nonvolatile memory of the disk controller comprises a microprogram for controlling a CPU of the disk controller.

16. A method of installing software on a storage device controlling apparatus according to claim 10, wherein the firmware written into the nonvolatile memory of the channel controller comprises a loader and an installer used by the channel controller to install an operating system into storage device for enabling the file access processing section to function.

17. A method of installing software on a storage device controlling apparatus according to claim 16, further comprising installing the operating system into the storage device for enabling the file access processing section to function as a NAS channel controller.

18. A method of installing software on a storage device controlling apparatus according to claim 10, further comprising writing software for enabling the file access processing section to function, the software being written into the storage device by communicating with the channel controller via the second network.

19. A method of installing software on a storage device controlling apparatus according to claim 10, wherein the second network comprises an internal LAN in the storage device controlling apparatus.

20. A method of installing software on a storage device controlling apparatus according to claim 10, wherein the at least one channel controller and the at least one disk controller are further connected by a connecting section to a memory via a high-speed bus.

* * * * *